US012119532B2

(12) United States Patent
Jaeschke et al.

(10) Patent No.: US 12,119,532 B2
(45) Date of Patent: Oct. 15, 2024

(54) WAVEGUIDE ARRANGEMENT

(71) Applicant: 2pi-Labs GmbH, Bochum (DE)

(72) Inventors: Timo Jaeschke, Hattingen (DE); Simon Kueppers, Bochum (DE)

(73) Assignee: 2pi-Labs GmbH, Bochum (DE)

( * ) Notice: Subject to any disclaimer, the term of this patent is extended or adjusted under 35 U.S.C. 154(b) by 328 days.

(21) Appl. No.: 17/782,342

(22) PCT Filed: Dec. 18, 2020

(86) PCT No.: PCT/EP2020/086948

§ 371 (c)(1),
(2) Date: Jun. 3, 2022

(87) PCT Pub. No.: WO2021/123111

PCT Pub. Date: Jun. 24, 2021

(65) Prior Publication Data

US 2023/0016951 A1 Jan. 19, 2023

(30) Foreign Application Priority Data

Dec. 20, 2019 (EP) .................................... 19218936
Apr. 3, 2020 (EP) .................................... 20167973

(51) Int. Cl.
*H01P 3/12* (2006.01)
*H01P 5/08* (2006.01)
(Continued)

(52) U.S. Cl.
CPC .............. *H01P 3/121* (2013.01); *H01P 5/082* (2013.01); *H01P 5/107* (2013.01); *H01P 11/002* (2013.01); *H01Q 1/2283* (2013.01)

(58) Field of Classification Search
CPC ........ H01P 5/107; H01P 11/002; H01P 3/121; H01P 5/082; H01P 3/123; H01Q 1/2283
See application file for complete search history.

(56) References Cited

U.S. PATENT DOCUMENTS 6,323,818 B1 11/2001 Koh et al.
10,468,736 B2 11/2019 Mangaiahgari
(Continued)

FOREIGN PATENT DOCUMENTS

EP 2500978 B1 7/2013
WO WO 2009/100891 A1 8/2009
WO WO 2010/104486 A1 9/2010

OTHER PUBLICATIONS

International Preliminary Report on Patentability for International Application No. PCT/EP2020/086948, mailed Jun. 30, 2022.
(Continued)

*Primary Examiner* — Quan Tra
(74) *Attorney, Agent, or Firm* — Jason H. Vick; Womble Bond Dickinson (US) LLP

(57) ABSTRACT

A waveguide arrangement for guiding electromagnetic waves in a cavity surrounded by conductive material is proposed, wherein the waveguide arrangement comprises a printed circuit board material having an electrically conductive, plate-shaped back, a substrate and a conductive layer arranged on a side of the substrate facing away from the back. According to the invention, it is provided that the back has a surface structure, preferably formed by at least one recess, by which the waveguiding cavity is at least partially directly bounded; and/or that the cavity is formed in split-block technology by joining the printed circuit board material as split-block bottom part with a corresponding cover as split-block top part.

19 Claims, 9 Drawing Sheets

Figure 1:
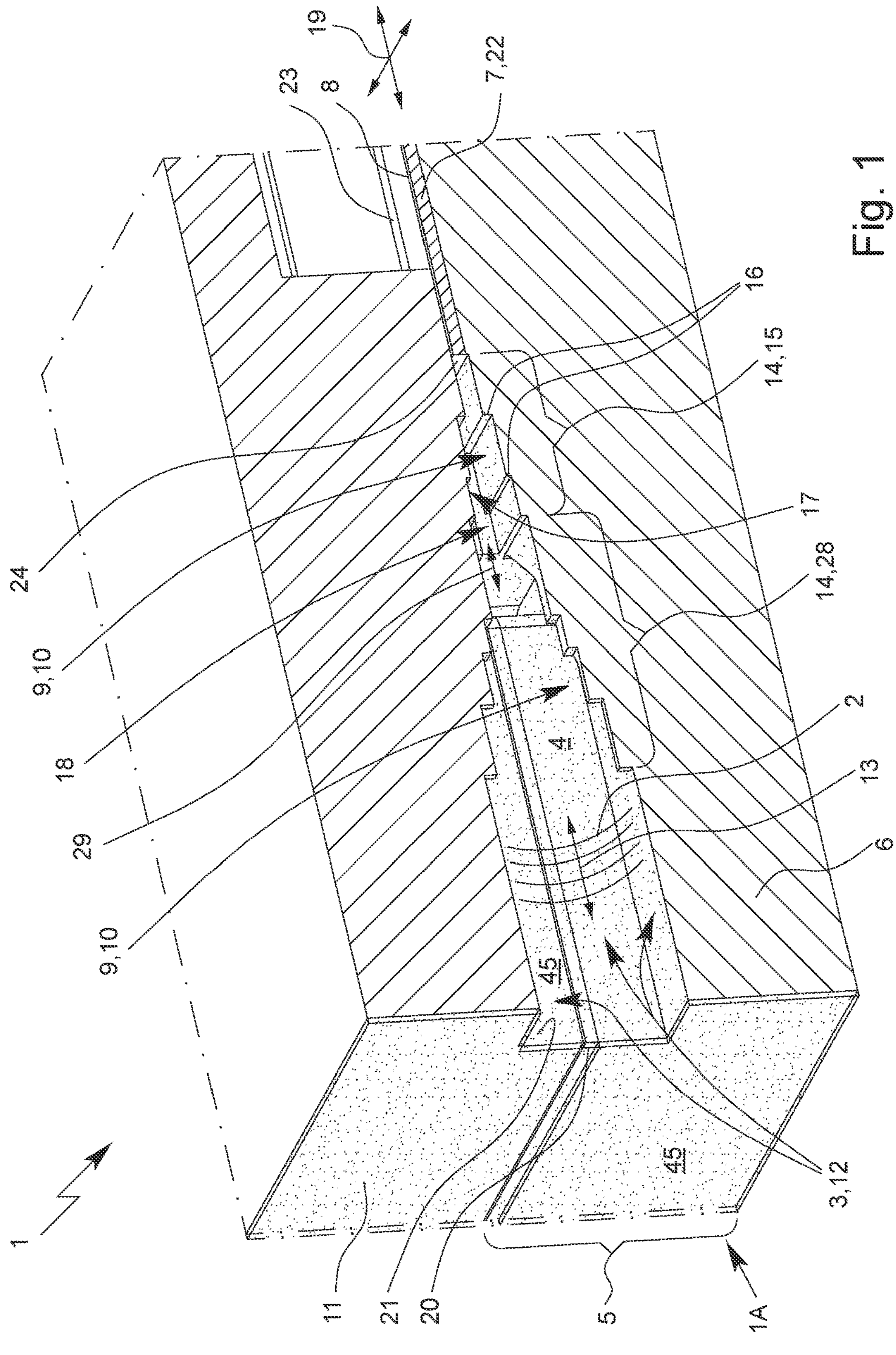

(51) Int. Cl.

| | |
|---|---|
| ***H01P 5/107*** | (2006.01) |
| ***H01P 11/00*** | (2006.01) |
| *H01Q 1/22* | (2006.01) |

(56) References Cited

U.S. PATENT DOCUMENTS

| | | | | |
|---|---|---|---|---|
| 11,482,767 | B2 * | 10/2022 | Krueger | H01P 3/122 |
| 2003/0059151 | A1 * | 3/2003 | Brist | H05K 1/0237 427/163.2 |
| 2008/0280583 | A1 | 11/2008 | Chattopadhyay et al. | |
| 2010/0321262 | A1 | 12/2010 | Pohl | |
| 2014/0091884 | A1 | 4/2014 | Flatters | |
| 2022/0209425 | A1 * | 6/2022 | Zhang | H01Q 21/24 |

OTHER PUBLICATIONS

Geterud, Erik G. et al. "Lightweight Waveguide and Antenna Components Using Plating on Plastics" 2013 7th European Conference on Antennas and Propagation (EuCAP); Apr. 8, 2013; pp. 1812-1815.

International Search Report for International Application No. PCT/EP2020/086948, mailed Mar. 16, 2021.

Written Opinion for International Application No. PCT/EP2020/086948, mailed Mar. 16, 2021.

* cited by examiner

WAVEGUIDE ARRANGEMENT

CROSS-REFERENCE TO RELATED APPLICATIONS

This application is a national stage application under 35 U.S.C. 371 of PCT Application No. PCT/EP2020/086948 having an international filing date of 18 Dec. 2020, which designated the United States, which PCT application claimed the benefit of European Application No. 19218936.3, filed 20 Dec. 2019 and European Application No. 20167973.5, filed 3 Apr. 2020, each of which are incorporated herein by reference in their entirety.

The present invention relates to a waveguide arrangement for guiding electromagnetic waves in a cavity surrounded by conductive material, and to a method of manufacturing a waveguide arrangement.

Waveguides are well known in the prior art as waveguides for electromagnetic waves, predominantly for those in the GHz frequency range, i.e. in particular for use between 1 GHz and 1 THz. Waveguides are usually metal tubes or cavities surrounded by metal with mostly rectangular, circular or elliptical cross-sections. Most relevant in practice and therefore always used here as an example without limitation of generality are so-called rectangular waveguides, i.e. waveguides with basically rectangular or square cross-section.

Further, the present invention relates to a waveguide arrangement comprising a printed circuit board material having a back and a conductive (electrically conductive) layer. In particular, the printed circuit board material is a so-called PCB material for the manufacture of printed circuits (Printed Circuit Board).

In this context, the back refers in particular to the part of the printed circuit board material that gives the printed circuit board material or the waveguide arrangement mechanical stability. Accordingly, the back is preferably plate-shaped.

It is preferred, especially for high-frequency applications, that the back—at least predominantly—consists of an electrically conductive material, for example a metal such as copper or the like. In this case, the printed circuit board material preferably has an electrically insulating substrate (dielectric), which is arranged at least in sections between the back and the conductive layer. A metallic back offers the advantage that it can act directly as a ground reference surface for high-frequency structures such as striplines.

In principle, however, it is also possible for the back to consist—at least predominantly—of an electrically insulating material or a dielectric. In this case, the back preferably forms the substrate or the back is attached to the substrate. An additional substrate between the back and the conductive layer is not necessary in this case.

The conductive layer is regularly much thinner than the back, which in applications in the high-frequency range, as in the present case, is preferably also electrically conductive and usually made of metal, in particular copper, and can lend stability to the printed circuit board material. In addition, the back usually also serves to dissipate heat. The substrate insulates the conductive back from the conductive layer, so that strip lines can be realized with the conductive layer, for example, which use the back as a ground or reference electrode. Accordingly, the material is preferably a so-called double-sided printed circuit board material.

EP 2 500 978 B1 concerns a so-called waveguide transition between a substrate-integrated waveguide realized with a printed circuit board substrate and a waveguide. The waveguide is manufactured in the so-called split-block technology. In this process, the tubular cross-section of a waveguide is produced by surface structuring of two mutually corresponding blocks which, when assembled, then realize the desired waveguide structure, for example a cavity with a rectangular cross-section surrounded by conductive material as a rectangular waveguide.

A printed circuit board material is inserted into the split-block structure in the prior art. The waveguide fabricated in split-block technology has a comb-shaped coupling structure for coupling the substrate-integrated waveguide to the waveguide, which covers the waveguiding substrate of the substrate-integrated waveguide and projects from the sidewalls spaced apart from the ceiling onto the substrate-integrated waveguide. The comb-shaped coupling structure has steps, at the end of which is a rectangular waveguide with a fully rectangular cavity. The coupling of a signal from the substrate-integrated waveguide into the waveguide is performed by the comb-shaped coupling structure perpendicular to the main extension plane of the printed circuit board material inserted into a split-block lower part.

Split-block constructions known from the prior art regularly require a high material input for stability reasons and due to the frequently required accommodation of the PCB material. The production of mostly two separate split-block parts and a high-frequency substrate with enormous precision requirements for all three parts (split-block parts and high-frequency substrate) regularly leads to high manufacturing costs. In addition, although striplines and substrate-integrated waveguides are realized with PCB material in the prior art, where the substrate (dielectric) is used to conduct the electromagnetic waves, making the substrate-integrated waveguide act as a dielectric-filled waveguide. However, waveguides with a cavity are then created and coupled elsewhere, which basically requires costly precision fabrication processes and results in large, heavy arrangements.

U.S. Pat. No. 10,468,736 B2 relates to an arrangement for coupling a substrate-integrated waveguide to a rectangular waveguide, wherein, in a printed circuit board material, a plurality of conductive layers are perforated in a window-like manner on a side facing away from a back in order to enable coupling between the substrate-integrated waveguide formed by the printed circuit board material and the rectangular waveguide. In this case, the coupling takes place between the printed circuit board (PCB) material formed in one plane and the rectangular waveguide, the cavity of which extends perpendicular to this plane. The window in the conductive layers leads here to the opening of the substrate-integrated waveguide on its flat side facing away from the back of the PCB material to the cavity of the rectangular waveguide. Although this design does not require split-block technology, it requires a lot of space due to the waveguide running transverse to the substrate-integrated waveguide and leads to stability problems, positioning problems as well as complex assembly technology.

Against this background, it is the task of the present invention to disclose a waveguide arrangement and a method for manufacturing a waveguide arrangement that is particularly compact, resource-saving and reliable.

This task is solved according to the proposal by a method according to claim 1 or a waveguide arrangement according to claim 11. Advantageous further developments are the subject of the subclaims.

A first aspect of the present invention relates to a method of manufacturing a waveguide arrangement comprising a cavity surrounded by conductive material for guiding electro-magnetic waves. The method comprises the at least partial creation of the cavity by removing in a printed circuit board material, which may initially be unprocessed printed circuit board (base) material comprising a plate-shaped back, optionally an electrically insulating substrate and at least one conductive layer—preferably arranged on a side of the substrate facing away from the back—in sections (i.e. in a specific region of the printed circuit board material which is subsequently to delimit the cavity) the conductive layer, the substrate (if provided) and parts of the back. This forms a surface structure.

The substrate—if provided—is open at the sides of the structured areas due to the processing—preferably milling or lasering. Subsequently, an electrically conductive wall is created by depositing conductive material, which covers the substrate and laterally limits the cavity.

The boundary of the cavity by the conductive wall preferably extends over at least substantially the entire surface of the substrate interfaces exposed after formation of the surface structure or recess.

Another aspect of the present invention relates to a waveguide arrangement for guiding electromagnetic waves in a cavity surrounded by conductive material, the waveguide arrangement comprising a printed circuit board material having at least an electrically conductive back and an electrically conductive layer. The back has a surface structure by which the waveguiding cavity is at least partially bounded. Furthermore, the waveguide arrangement has a substrate integrated waveguide material which is coupled to the cavity—in particular in the region of the surface structure It is thus provided that the back of the printed circuit board material has a surface structure by which the waveguiding cavity of the waveguide is at least partially directly bounded, the back preferably being surface-tempered or provided with conductive material on the surface and thus being able to directly adjoin the cavity. Very preferably, the surface structure is a recess or has a recess.

High-frequency printed circuit board materials, which are preferred here, preferably have a continuous electrically conductive back, in particular a copper back. For stability reasons, this is often several 100 μm thick, in particular between 0.5 and 2 mm. In the initial state before structuring of the printed circuit board material, the back is preferably plate-shaped with an at least essentially constant plate thickness. Only the conductive layer is regularly structured. For the present invention, a metallic back offers the advantage that structures or the recess can be introduced, for example milled, into the back with a high degree of accuracy. Thus, a high quality of the waveguide arrangement can be achieved in a simple way.

However, it is not mandatory that the backing is electrically conductive. In principle, it is primarily important that the backing has an electrically conductive layer or surface and/or that the surface structure is electrically conductive.

Therefore, it is also possible in principle for the back to have or consist at least essentially or predominantly of an electrically insulating material or dielectric. In this way, the structure of the waveguide arrangement can be simplified.

For manufacturing reasons, however, an electrically conductive back, in particular one made of solid metallic material such as copper, is preferred.

Known in the prior art is the use of printed circuit board material, in particular high-frequency printed circuit board material with a conductive back, to form striplines in which the conductive back is grounded and used as a ground reference plane, or to form substrate-integrated waveguides, wherein the conductive back acts as a boundary of the substrate-integrated waveguide and the substrate or dielectric of the printed circuit board material together with via rows or, according to an advantageous aspect of the present invention which can be combined with further aspects of the present invention, milling or laser slots provided with an electrically conductive layer and a conductive layer provided to the substrate on the side facing away from the back.

The present invention teaches a departure from the usual forms of use of the back of printed circuit board material merely as a mechanical stabilization and/or to form a flat ground reference surface with low sheet resistance. Instead, according to the proposal, the back has a surface structure which deviates from the flat, plate-like, usual structure of the back of the printed circuit board material and serves to conduct electromagnetic waves, in particular to couple or generate modes for the purpose of wave conduction, i.e. is designed and preferably coupled for this purpose.

In particular, the surface structure is one or more recesses in the back as part of or to form the waveguiding cavity of the waveguide.

Preferably, the surface structure, insofar as it forms at least part of the waveguide or bounds the cavity, is free of interruptions. It is thus formed in the surface, but preferably does not break through the ridge transversely to its main extension plane. A waveguide preferably has a diameter transverse to a transmission direction of less than 15 mm, preferably less than 10 mm, and/or more than/at least 0.2 mm, preferably more than/at least 0.5 mm. Alternatively or additionally, it is provided that the surface structure extends at least substantially laterally or parallel to the main extension plane of the printed circuit board material to form the waveguide in the direction of the main extension plane of the printed circuit board material or parallel thereto.

In an embodiment in which the back is made of a non-conductive material, the surface structure preferably has or is coated with an electrically conductive material.

In another aspect of the present invention, which can also be implemented independently, it is provided that the waveguide is formed in split-block technology by joining the printed circuit board material as a split-block lower part with a corresponding cover as a split-block upper part.

In other words, the electrically conductive, plate-shaped back of the PCB material is preferably used in a structured manner to form part of a split-block waveguide. The use of the back to form the waveguide instead of a classical split-block bottom part milled from the solid metal has proven to be very resource-saving and advantageous for the construction of particularly compact waveguide arrangements and transitions to waveguides.

The division of the waveguide into two substructures (i.e. split-block upper part and split-block lower part) is particularly advantageous in that the lengths of the milling tools can be reduced for fine milling structures, thereby increasing the manufacturing accuracy. In addition, by combining a split-block part and the substrate material into a single component, manufacturing costs can be saved and tolerances between the PCB and the waveguide structure can be significantly eliminated by the joint milling process of the PCB and split-block part.

A "waveguide arrangement" in the sense of the present invention is preferably an arrangement comprising or forming at least one waveguide.

A "waveguide" in the sense of the present invention is, as already explained above, preferably an elongated cavity with electrically conductive boundary surfaces surrounding the cavity laterally. Along the cavity and the boundary surfaces, electromagnetic waves or modes are capable of propagation, preferably in frequency bands lying between 5 GHz and 1 THz.

A "printed circuit board material" in the sense of the present invention has a preferably electrically conductive, plate-shaped back, a substrate (dielectric) and at least one conductive layer arranged on a side of the substrate facing away from the back.

Usually, the back is formed from an electrically conductive material, in particular metal, especially preferably copper. The back can be mechanically stable and/or provide mechanical stability to the PCB material. The back is preferably formed from its dimensionally stable material, for example with a material thickness between 0.1 and 5 mm, particularly preferably between 0.5 and 2 mm.

Particularly preferably, the back is formed from a one-piece, electrically conductive material. Alternatively or additionally, the back can also be formed from an electrically insulating material and/or have a multilayer structure. In particular, it is possible for a preferably conductive layer adjacent to the substrate, which preferably has the surface structure completely or at least substantially, to be connected to a further preferably conductive carrier layer, in particular glued, soldered or otherwise connected in a preferably electrically conductive manner. This may serve for stabilization and/or assembly. The surface structure can optionally also extend into such a carrier layer, preferably without breaking through the back as a whole.

A "substrate" in the sense of the present invention is preferably understood to mean an insulating material, an insulator or dielectric. In particular, it is a dielectric suitable for the high frequency range, especially for more than 10 GHz. This can be PTFE, ceramic or a PTFE-ceramic composite material. In principle, however, other materials can also be used.

A "conductive layer" is preferably understood to mean an electrically conductive layer, in particular a so-called copper cladding or conductor layer. The conductive layer is particularly preferably a mechanically or chemically structurable metal layer, preferably comprising or consisting of copper, with which, for example, strip lines, in particular microstrip lines, can be produced by structuring. A conductive layer is preferably thin compared to the substrate and/or back. While the conductive layer has a material thickness of typically between 5 and 35 μm, the substrate can have a material thickness of typically 100 μm to 400 μm.

For the purposes of the present invention, "split-block technology" preferably means a technology in which mutually corresponding or complementary electrically conductive, surface-structured parts are supplemented by joining to form a waveguide. Here, at least two parts are to be joined together in an electrically conductive manner, hereinafter referred to as "split-block lower part" and "split-block upper part". It should be noted that the terms "lower part" and "upper part" are preferably only used to differentiate between the different parts and do not prescribe a specific installation position.

In split-block technology, the split-block lower part is preferably provided with a surface structure, in particular a groove or the like. The same applies to the split-block upper part, in particular whereby the surface structures can be similar, corresponding or complementary to one another. By joining the split-block lower part with the split-block upper part, the surface structures of these complement each other to form the wave-guide. Preferably, the split-block lower part and the split-block upper part have mutually corresponding alignment aids for specifying a position of the surface structures relative to one another, where by an exact formation of the waveguide by assembly is facilitated or made possible. However, this is not mandatory.

A "cover" in the sense of the present invention is a device adapted to cover the printed circuit board material by applying the cover to the printed circuit board material such that surface structures in the printed circuit board material are covered and thereby closed along a flat side of the printed circuit board material. A cover in the sense of the present invention has an electrically conductive flat side corresponding or complementary to the surface structure of the printed circuit board material, with which recesses in the printed circuit board material are or can be bridged so that at least one waveguide results when the cover is in contact with the printed circuit board material, in particular the conductive layer. The cover preferably has a surface structure, in particular with recesses, but can also be flat or cover the surface structures of the circuit board material with a flat surface in a corresponding manner to close them to form waveguides. It is understood that "covering" and "sealing" leave open that an opening of the waveguide or cavity formed by "covering" and "sealing", respectively, can be provided towards the environment.

Further aspects, advantages and features of the present invention will be apparent from the claims and the following description of advantageous embodiments with reference to the drawing.

Figure 2:
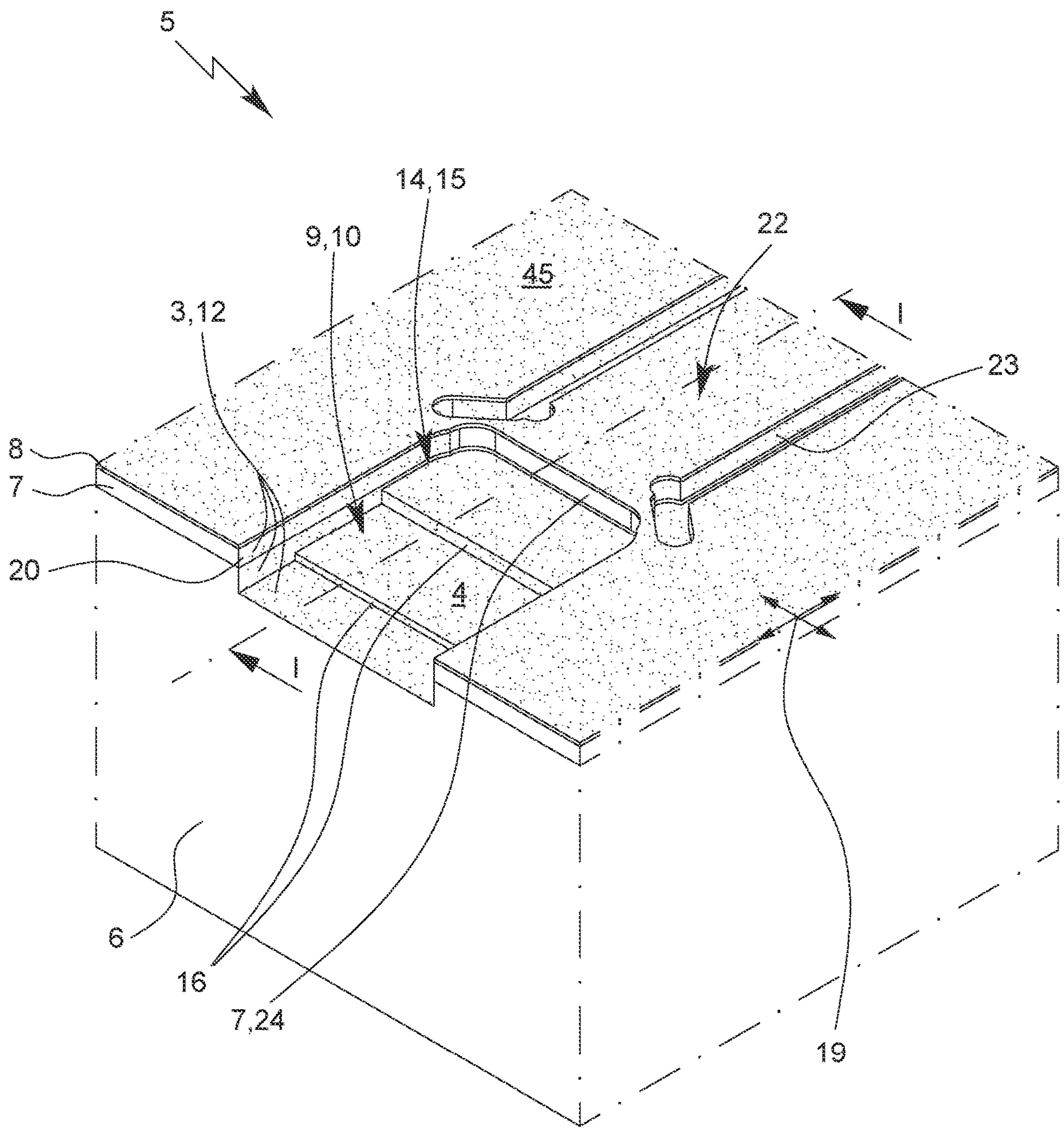
Figure 2A:
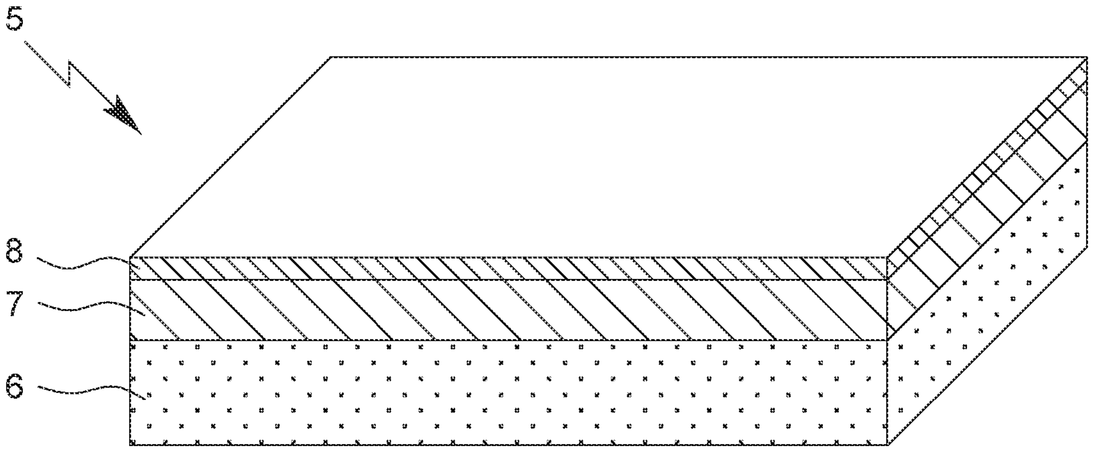

In the drawing shows:

FIG. 1 a perspective section of the waveguide arrangement according to the proposal;

FIG. 2 a partial perspective plan view of the printed circuit board material of the waveguide arrangement according to the proposal;

FIG. 2A a perspective view of a section of the printed circuit board material (base material)

Figure 2B:
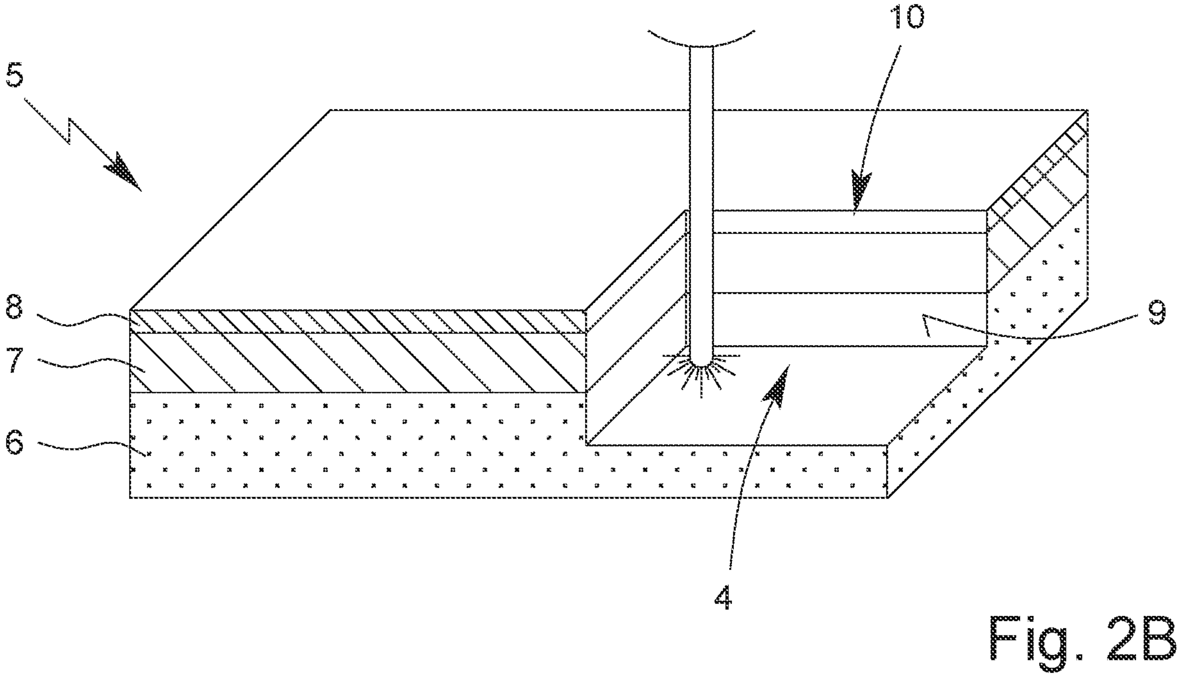
Figure 2C:
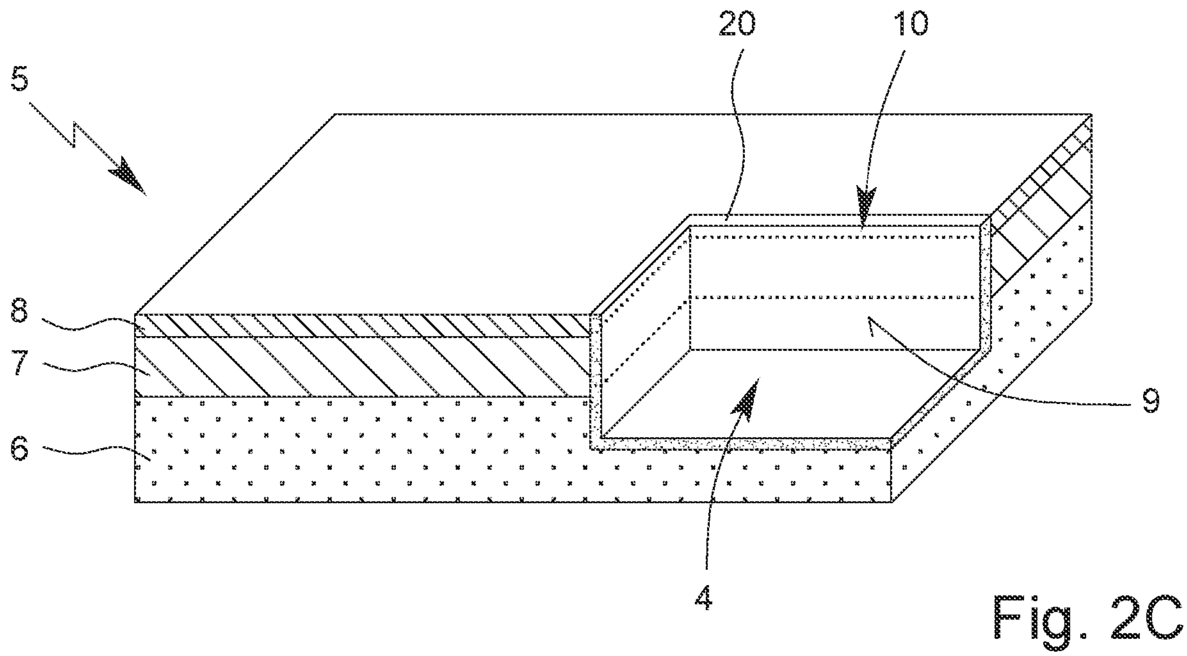
Figure 2D:
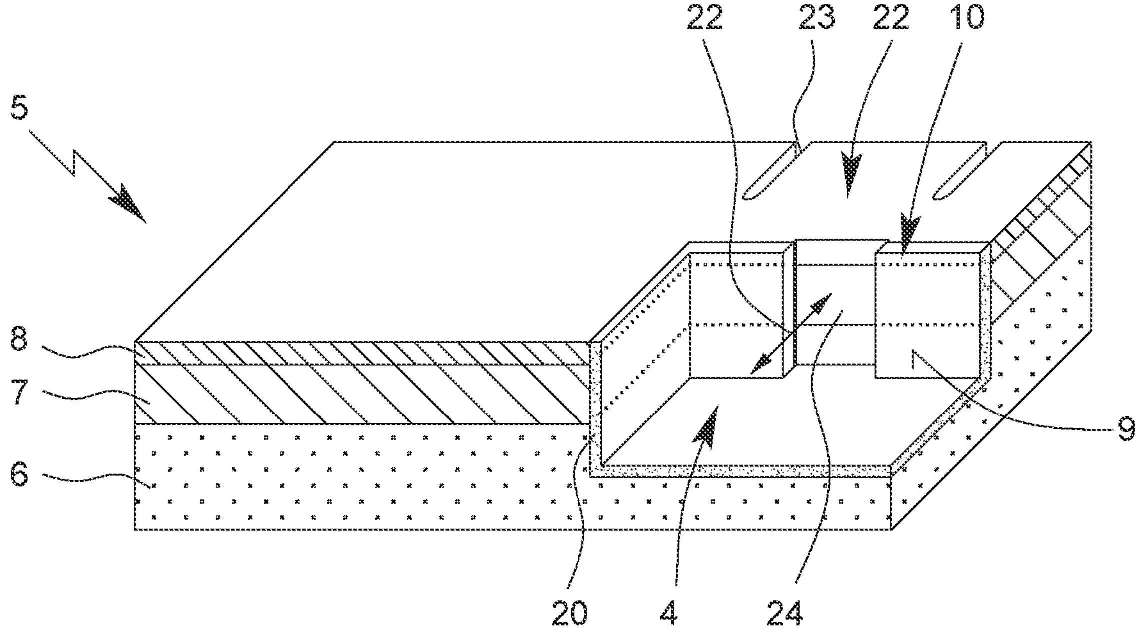
Figure 3:
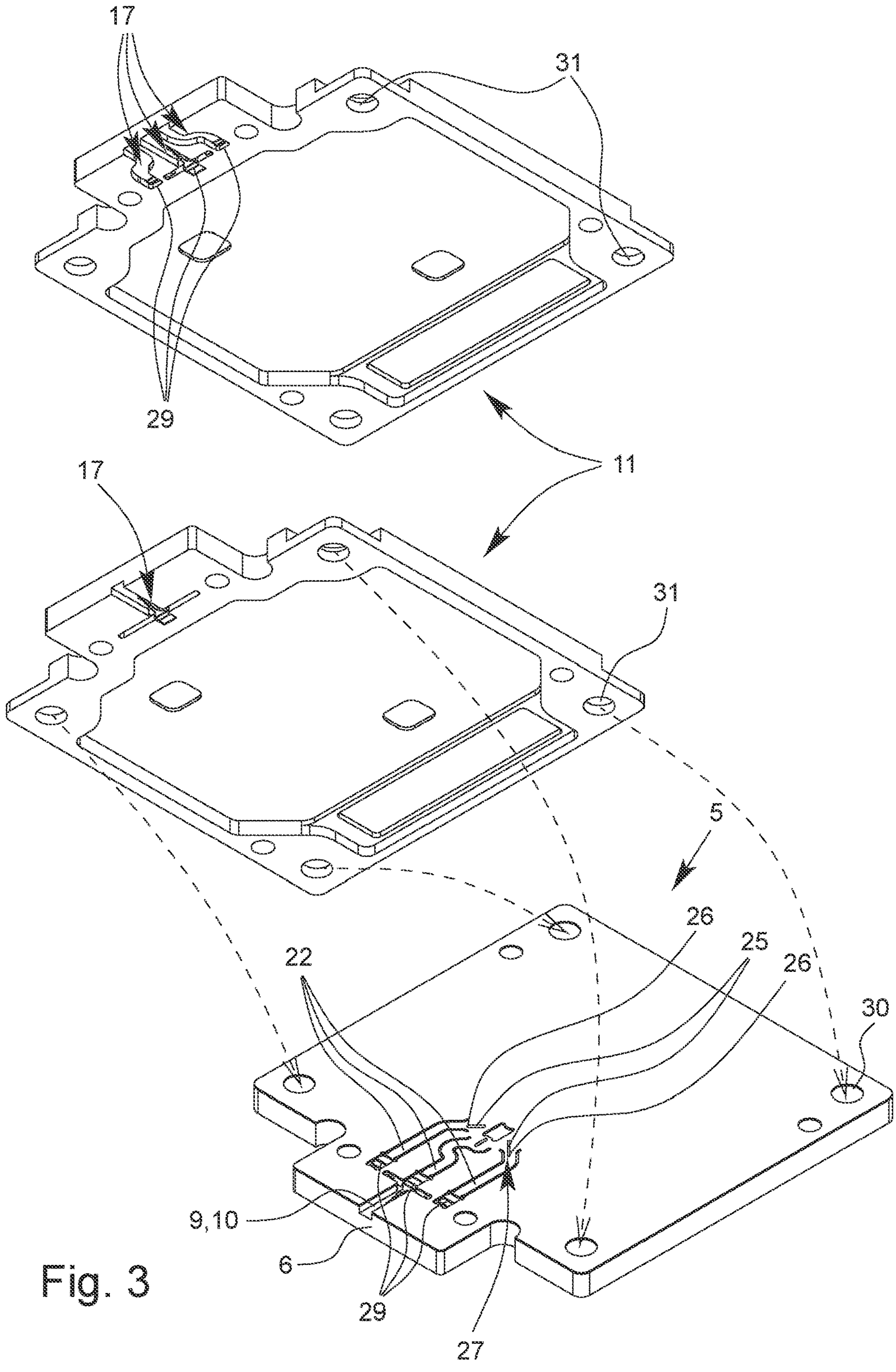
Figure 4:
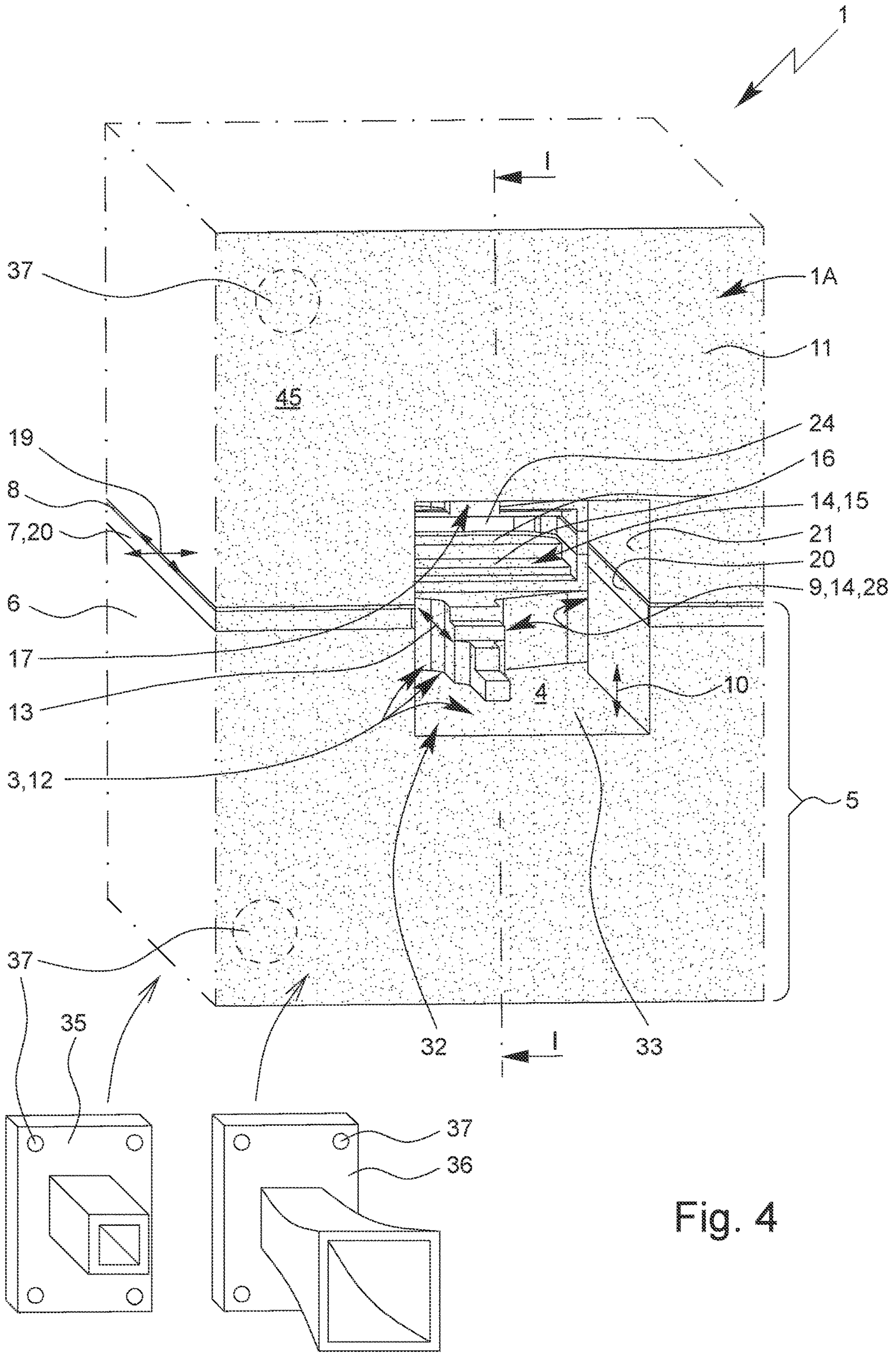
Figure 5:
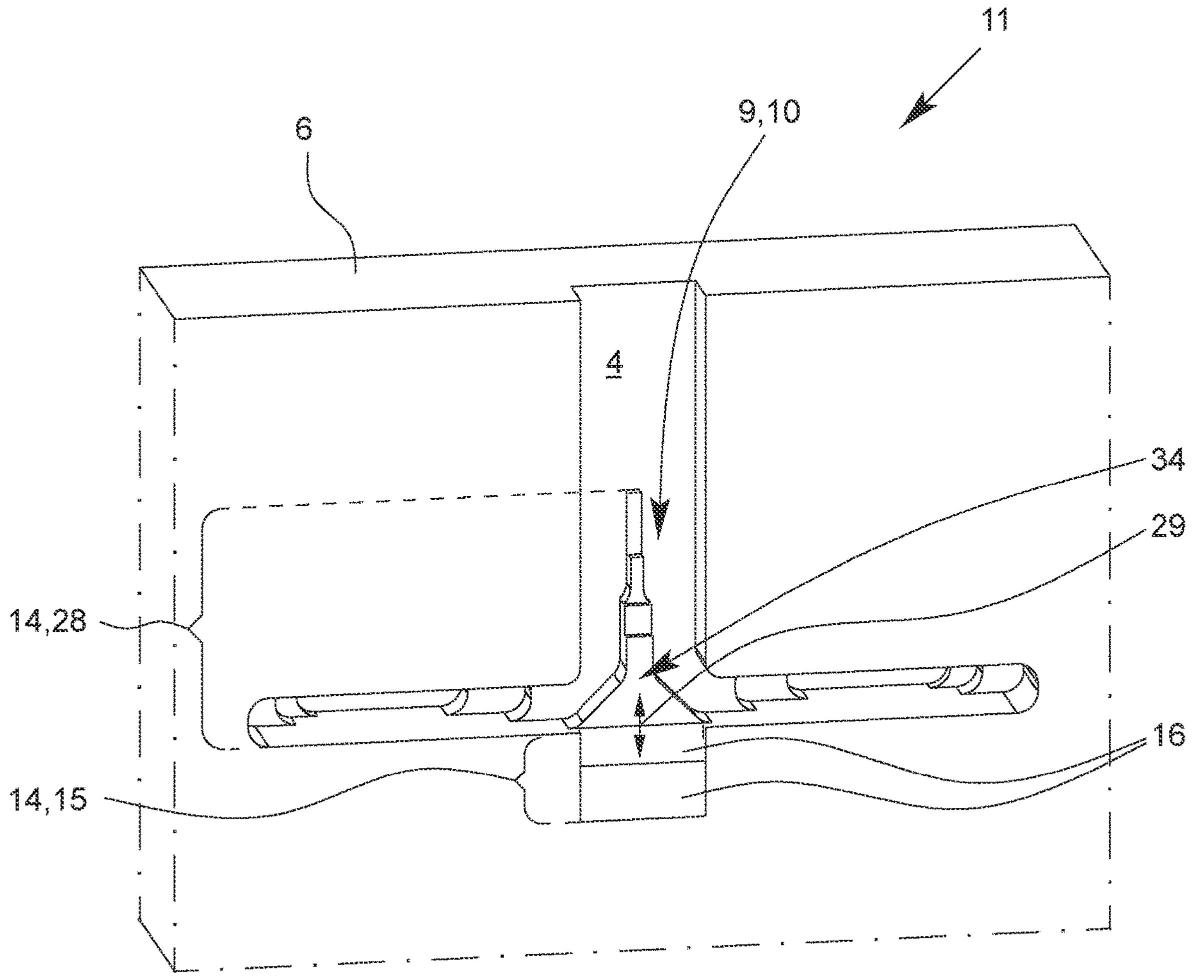
Figure 6:
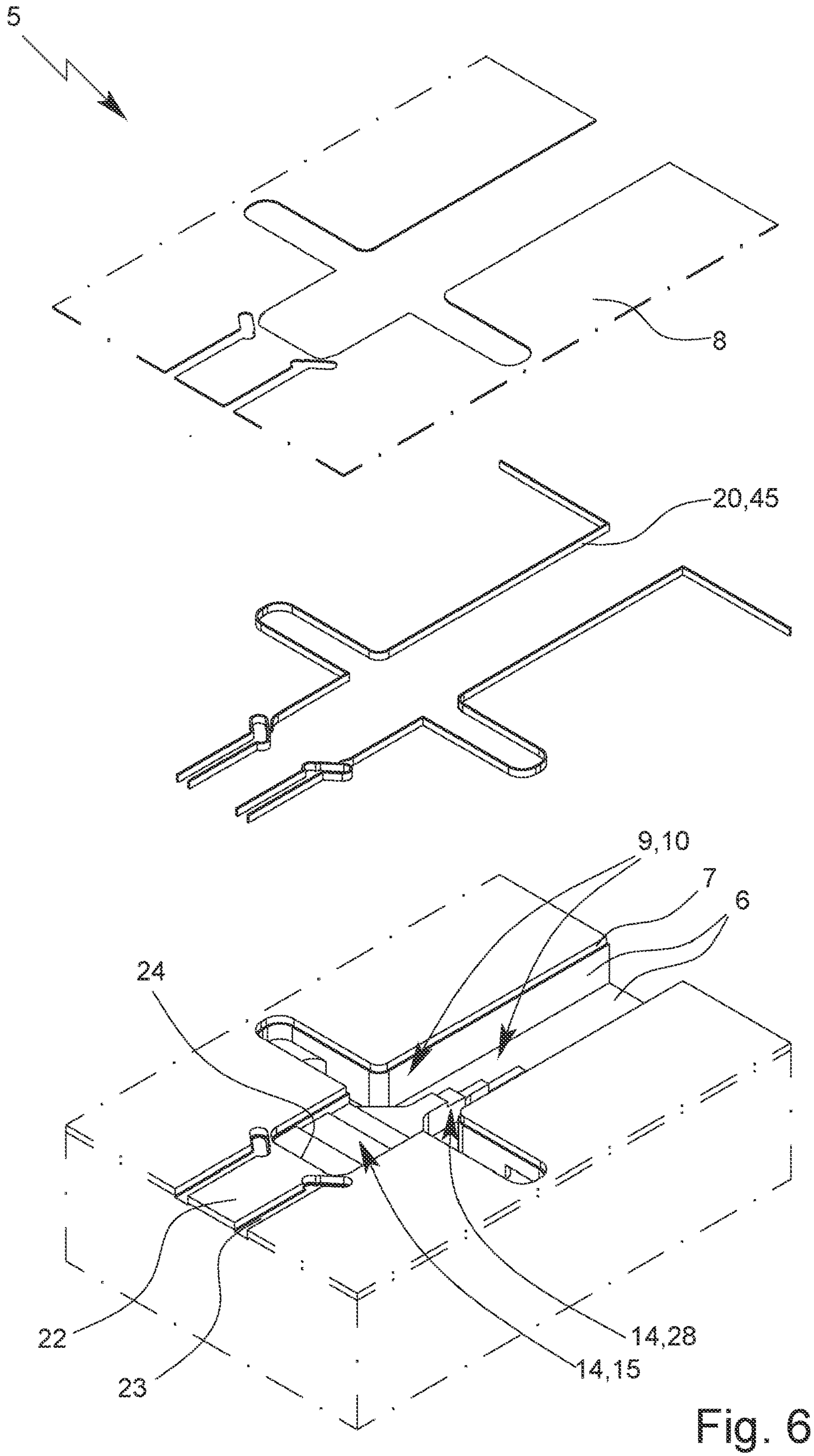
Figure 7:
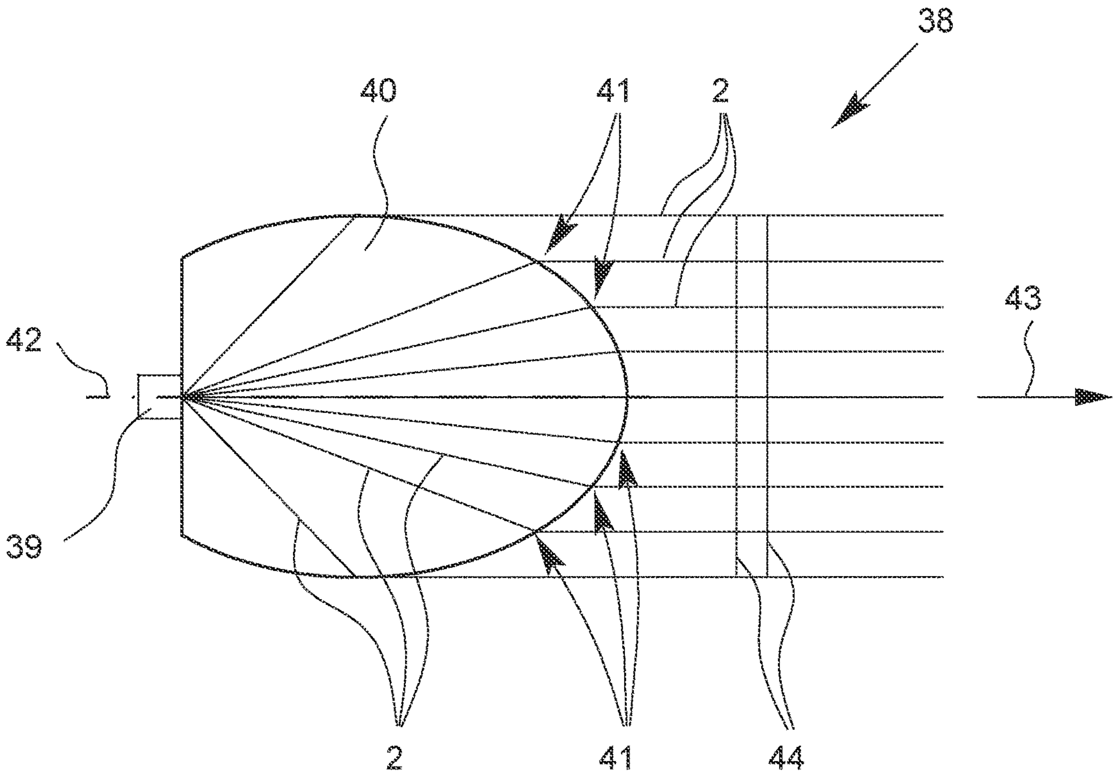

FIG. 2B a perspective view of a section of the printed circuit board material FIG. 2A with surface structure/recess;

FIG. 2C a perspective view of a section of the printed circuit board material with surface structure/recess as shown in FIG. 2B and with substrate covered by conductive walls;

FIG. 2D a perspective view of a section of the PCB material with surface structure/recess, with substrate covered by conductive walls as shown in FIG. 2C, and substrate interface opened as a window;

FIG. 3 perspective views of a printed circuit board material and two corresponding, different covers;

FIG. 4 a sectional top or side view of the waveguide arrangement according to the proposal with a perspective view into the cavity;

FIG. 5 a perspective, sectional view of a cover from FIG. 3;

FIG. 6 an exploded view of a section of the printed circuit board material with a wall;

FIG. 7 a cross-section of a dielectric antenna; and

Figure 8:
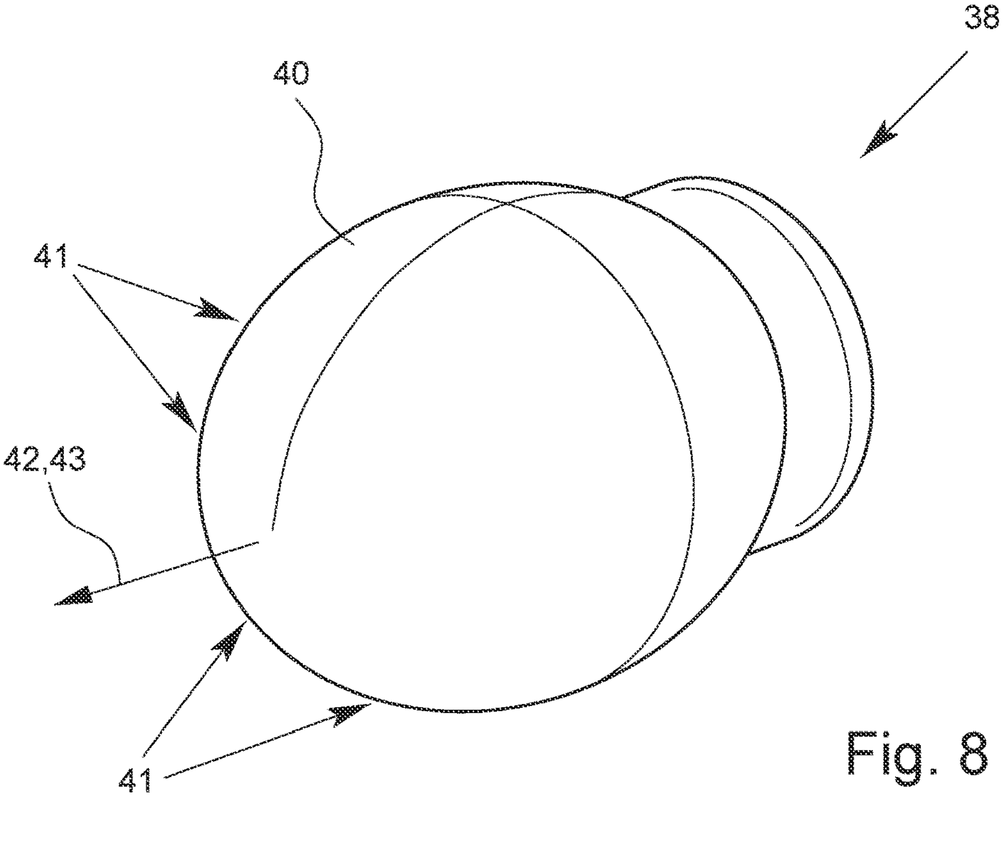

FIG. 8 a perspective view of the dielectric antenna of FIG. 7.

In the figures, the same reference signs are used for the same or similar parts, whereby the same or similar properties may result, even if a repeated description of these is omitted.

FIG. 1 shows a perspective view of the waveguide arrangement 1 according to the proposal for guiding electromagnetic waves 2 in a cavity 4 surrounded by conductive material 3.

The cavity 4 is here preferably dimensioned in such a way that electromagnetic waves 2 in the high-frequency range, in particular in the so-called millimeter wave range with a wavelength between approx. 0.3 mm and 10 mm and/or frequencies between approx. 30 GHz and 1 THz are able to propagate.

The waveguide arrangement 1 has a printed circuit board material 5, which has a preferably plate-shaped back 6 and a conductive layer 8. The conductive layer 8 is electrically conductive.

The back 6 preferably consists of a mechanically stable or dimensionally stable material. This can provide mechanical stability to the waveguide arrangement 1 or the part thereof formed by the printed circuit board material 5.

In addition, the back 6, in particular if it is made of a thermally conductive material such as a metal, is preferably designed to dissipate heat from an electrical circuit, preferably a high-frequency circuit for generating, receiving and/or converting frequencies capable of propagation in the cavity 4, in particular an integrated circuit or a chip of the wave-guide arrangement 1. For this purpose, a recess is preferably formed in the back 6, in particular by removing material of the back 6, and the circuit, an active component thereof or the chip is arranged in the recess, in particular connected to the back 6 in a thermally conductive manner, for example glued.

Particularly preferably, the back 6 is formed from an electrically conductive material, in particular a metal, especially preferably copper, gold or the like. In this case, the printed circuit board material 5 has a substrate 7 (dielectric) in addition to the back 6 and the conductive layer 8, the conductive layer 8 being arranged on a side of the substrate 7 facing away from the back 6. The substrate 7 consists in particular of a non-conductive or electrically insulating material. The embodiment with electrically conductive back 6, substrate 7 and conductive layer 8 is shown in the figures.

In principle, however, it is also possible for the back 6 to be made of a non-conductive material, for example FR-4. Preferably, the back 6 forms the substrate 7 in this case, or an additional substrate 7 arranged between the back 6 and the conductive layer can be dispensed with. This embodiment example is not shown in the figures. For heat dissipation for the circuit, a heat-conducting region or insert can be provided in the back 6 in this case.

The substrate 7 very preferably consists of PTFE (polytetrafluoroethylene), ceramic (in particular aluminum oxide and/or aluminum nitride), PTFE-ceramic composite or has PTFE, ceramic or PTFE-ceramic composite. PTFE-ceramic composite is preferably an at least substantially homogeneous mixture of PTFE and ceramic particles. The substrate 7 is preferably deformable.

The back 6 is preferably more dimensionally stable, more flexurally rigid and/or more flexurally resistant than the substrate 7 and/or the conductive layer 8. The substrate 7 is thus preferably softer and/or more easily deformable than the back 6. The back 6 may have a material with a modulus of elasticity of more than 5000, preferably more than 10000, or may be formed at least substantially from this material. The back 6 preferably has at least the dimensional stability or flexural rigidity/flexural strength of a copper sheet with a constant material thickness of 0.5 mm, 1 mm or more.

Alternatively or additionally, the substrate 7 can be made of a dimensionally stable, electrically insulating material, for example FR-4. FR-4 designates a class of flame-retardant composite materials consisting of epoxy resin and glass fiber fabric. In this case, the printed circuit board material 5 preferably has the conductive layer 8 supported by the substrate 7 and, as a backing 6, a further conductive layer—preferably of greater material thickness than that of the conductive layer 8—on the side of the substrate 7 facing away from the conductive layer 8.

In particular, the printed circuit board material 5 in this case is a so-called double-sided printed circuit board material 5. The double-sided printed circuit board (base) material 5 is structured in that, starting from the flat side with the thinner conductive layer 8, the recess 10 is formed through the substrate 7 up to or into the back 6, i.e. is or is structured according to the proposal. It is sufficient for the recess 10 to extend only slightly into the back 6.

Regardless of a property of the substrate 7 primarily or in any case partly determining the shape or stability of the printed circuit board material 5 in this case, the back 6 is provided on the side of the substrate 7 facing away from the conductive layer 8. In this context, the back 6 is electrically conductive, in particular made of metal such as copper or a metal layer composite such as a composite of a (thinner) copper layer and a (thicker) brass layer or plate. A heat conducting region or insert may be provided in the substrate 7 for heat dissipation for the circuit.

In principle, the waveguide arrangement 1 and/or the PCB material 5 and/or a split-block part comprising the PCB material 5 or formed by the PCB material 5 may also have more than two layers (non-conductive back 6+conductive layer 8) or three layers (conductive back 6+substrate 7+conductive layer 8). For example, it is possible that the PCB material 5 and/or the back 6 has or is formed by a plurality of alternating conductive and non-conductive layers. Furthermore, it is also possible that a (further) printed circuit board material is or is applied to the—conductive or non-conductive—back 6, which has or is formed by a non-conductive substrate arranged between two conductive layers. Other solutions are also possible.

Accordingly, the back 6 is preferably formed integrally with the PCB material 5, but may also be formed separately from the PCB material 5, for example by the back 6 being bonded, soldered or otherwise form-fitted to the PCB material 5.

In the illustration example, the printed circuit board material 5 or the back 6 has a surface structure 9, which in the embodiment example is formed as a recess 10. The surface structure 9 or recess 10 preferably forms the cavity 4 or at least a part of the cavity 4.

The cavity 4 is preferably formed in split-block technology by joining the printed circuit board material 5 as the split-block lower part with a corresponding cover 11 as the split-block upper part. The cavity 4, which acts as a waveguide, is/are formed by electrically conducting joining of the split-block lower part and split-block upper part. The cavity 4 is bounded by the conductive material 3, and in the present embodiment example primarily by the electrically conductive surface of the cover 11 and the electrically conductive surface of the back 6. The material 3 may be or comprise precious metal such as gold, at least on the surface.

Alternatively or additionally, lateral boundary surfaces 12 are preferably provided which electrically conductively connect the back 6 to the cover 11. This forms a wave-guide in split-block technology, in which the cavity 4 is uninterruptedly surrounded by conductive material 3 radially to the transmission direction for electromagnetic waves 2 indicated by the arrow 13 in the illustration example. The boundary surfaces 12 can be formed by depositing conductive material 3, preferably metal, in particular copper and/or gold.

In particular, the waveguide arrangement 1 or the boundary surfaces 12—or at least the boundary surfaces having the interface formed between the printed circuit board material 5 and the cover 11—have or are formed by an (additional) conductive layer or plating 45. The conductive layer or plating 45 ensures in particular that the cavity 4 is continuously or completely surrounded by or bounded by electrically conductive material 3, in particular if the back 6 and/or the cover 11 consist of a non-conductive material. However, the conductive layer or plating 45 has also proved to be particularly advantageous in the case that back 6 is made of conductive material.

Preferably, the conductive layer or plating 45—with the exception of the interface 24 explained later—extends at least substantially over the entire surface of the printed circuit board material 5, at least on the cavity 4 bounding and/or end faces thereof, and further preferably over the entire surface of the waveguide arrangement 1 or the two split-block parts.

In FIGS. 1, 2 and 4, the conductive layer or plating 45 is represented by a dotted area. In the illustrations in FIGS. 3 and 5, the conductive layer or plating 45 has been hidden for illustrative purposes. Nevertheless, the waveguide arrangement 1 here preferably also has the conductive layer or plating 45.

A "plating" is understood to mean in particular an electrically conductive layer, preferably arranged on or applied to a surface. This conductive layer can be applied in particular galvanically or by electroplating, in particular copper plating, to the back 6, the substrate 7, the printed circuit board material 5 or the cover 11. In principle, however, any, in particular chemical and/or mechanical, processes for applying the conductive layer are possible.

The conductive layer or plating 45 is preferably produced by a copper plating process or process for depositing a metallic conductive layer. For this purpose, a surface may first be coated with graphite, whereupon the graphite is used to deposit a conductive metal layer, in particular electroplating. Alternatively or additionally, chemical processes can be used to deposit the conductive layer or plating.

If the back 6 or at least the side or surface of the back 6 which has or forms the surface structure 9 or recess 10 is made of a non-conductive material, the back 6 or the surface structure 9 or recess 10 preferably has the conductive layer or plating 45 and/or the conductive layer or plating 45 covers the surface structure 9 or recess 10, in particular completely. In this way, it is achieved in particular that the cavity 4 is completely surrounded by electrically conductive material 3, even if the back 6 itself is non-conductive.

In particular, an outer surface 1A of the back 6, cover 11 and/or waveguide arrangement 1, shown on the left side in FIG. 1, which surrounds or defines the opening 32 (explained further below) also has the conductive layer or plating 45.

Preferably, the printed circuit board material 5 or split-block lower part and/or the cover 11 and/or the waveguide arrangement 1 is or are coated with the conductive layer or plating 45 completely or at least on the surface forming the cavity 4 and preferably on the end faces.

Particularly preferably, the application of the conductive layer or plating 45 takes place after the printed circuit board material 5 and the cover 11 or the two split-block parts have been joined to form the waveguide arrangement 11, so that the cavity 4 is completely bounded by electrically conductive material 3 and/or the outer surface 1A of the waveguide arrangement 1 is coated with the conductive layer or plating 45. However, the conductive layer or plating 45 can also be done separately for the split block halves, i.e. the printed circuit board material 5 and the cover 11.

The waveguide arrangement 1 preferably has a waveguide functional element 14 formed at least in part by the printed circuit board material 5 or the back 6 of the printed circuit board material 5.

Preferably, the waveguide functional element 14 is also covered with, or the conductive layer or plating 45 also extends onto, preferably completely over, the waveguide functional element 14, particularly when the back 6 is made of non-conductive material.

Particularly preferably, the waveguide functional element 14 is a matching structure 15. With the matching structure 15, an impedance of the cavity 4 or of the waveguide formed by the cavity 4 can be changed to reduce or avoid reflections. This is particularly advantageous in the case of a transition to a waveguide or the coupling of electromagnetic waves 2 into the cavity 4.

Forming the waveguide functional element 14 at least partially through the printed circuit board material 5 or the back 6 of the printed circuit board material 5 is particularly advantageous, since this allows the printed circuit board material 5, which is usually already intended for other functions, to be used in a resource-saving and space-saving manner in addition to forming a waveguide and, moreover, to generate waveguide functional elements 14.

The matching structure 15 preferably has one or more steps 16. These are preferably formed at least in part by the back 6. The steps 16 can widen or taper a diameter of the cavity 4 transverse to the transmission direction.

Furthermore, it is preferred that the cover 11 has a surface structure 17 which is formed in a corresponding or complementary manner, in particular identically, mirror-invertedly and/or symmetrically, to the surface structure 9 of the back 6. In particular, the surface structure 9 of the back 6 corresponds to the surface structure 17 of the cover 11 in such a way that, by joining the printed circuit board material 5 to the cover 11, a wave-guide results which is designed to realize a waveguide function, in particular for impedance matching.

To apply the otherwise basically known split-block technology, the surface structure 17 of the cover 11 corresponds here to the surface structure 9 of the back 6 in such a way that the combination of printed circuit board material 5 and cover 11 surrounds the cavity 4, in particular with the conductive material 3 and/or radially to the transmission direction in an uninterrupted electrically conductive manner, thus forming the waveguide.

In the illustrative example, a rectangular waveguide 18, in particular with a partially at least substantially square cross-section, is formed by combining the printed circuit board material 5 with the cover 11. In principle, however, other shapes of waveguides or cavities 4 are also possible.

The cover 11 may overhang other components of the waveguide arrangement 1, such as a chip, an electrical circuit or the like, or serve as mechanical protection and/or electrical shielding for these components.

In order to form the cavity 4 using the printed circuit board material 5, in the area in which the printed circuit board material 5 at least partially forms or surrounds the cavity 4, the conductive layer 8 and/or the substrate 7 is preferably removed. In other words, in the part or section of the printed circuit board material 5 that bounds the cavity 4, the back 6 is preferably exposed on the substrate side or the conductive layer 8 is interrupted or removed. The back 6 preferably directly bounds the cavity 4. This includes a boundary of the cavity 4 by a surface-coated, in particular gold-plated, and/or plated back 6, in which the surface coating, in particular as a conductive layer or plating 45, directly adjoins the cavity 4.

The conductive layer 8 is electrically connected to the back 6 of the printed circuit board material 5 preferably at least substantially perpendicular to a main extension direction 19 of the printed circuit board material 5 by electrically conductive walls 20. The walls 20 laterally delimit the cavity 4. A rectangular waveguide 18 or a part and in particular a split-block lower part thereof may be formed by this.

Preferably, the walls 20 and/or sidewalls 21 are formed by or have the conductive layer or plating 45 or boundary surfaces 12.

The electrically conductive connection is preferably made through the conductive layer or plating 45 or boundary surfaces 12.

The walls 20 or the sections of the walls covering or covering the substrate 7 are preferably aligned with side walls 21 of the cover 11. In the position of use, the walls 20 between the back 6 and the conductive layer 8 and the side walls 21 of the cover 11 are electrically conductively connected to each other so that they form an electrically conductive lateral boundary for the cavity 4. The result is preferably a rectangular wave-guide 18.

FIG. 2 shows a sectional perspective top view of the printed circuit board material 5 of the waveguide arrangement 1 according to the proposal. The view according to FIG. 1 corresponds here, as far as the printed circuit board material 5 is concerned, to a section along the sectional line I-I from FIG. 2.

The waveguide arrangement 1 or the printed circuit board material 5 preferably has a substrate-integrated waveguide 22. The substrate-integrated waveguide 22 may be formed by the substrate 7 of the printed circuit board material 5. For this purpose, electrically conductive boundary surfaces perpendicular to the transmission direction indicated by the arrow 13 (in FIG. 1) adjoin a region of the substrate 7 that forms the substrate-integrated waveguide 22. In the illustrative example, these are the back 6 and the conductive layer 8. Preferably, these are electrically conductively interconnected laterally. This can basically be done by one or more vias. In the illustration example, the back 6 is connected to the conductive layer 8 by means of a groove 23, which extends through the conductive layer 8 and the substrate 7 to the back 6. The groove 23 preferably has a conductive coating which is/was produced in particular by depositing a conductive layer, in particular by copper plating. However, other solutions are also possible here.

The substrate-integrated waveguide 22 is preferably coupled to the cavity 4 or to the waveguide formed by the cavity surrounded by conductive material 3. The coupling preferably takes place in such a way that electromagnetic waves 2 can enter the cavity 4 from the substrate 7 and vice versa.

In a particularly advantageous manner, the waveguide functional element 14 in the form of the matching structure 15 is used for matching the substrate-integrated waveguide 22 to the cavity 4, or the matching structure 15 is formed for this purpose.

The back 6 of the printed circuit board material 5 preferably forms a continuous electrically conductive and, in particular, one-piece boundary surface of both the substrate-integrated waveguide 22 and the cavity 4. This enables a very particularly compact waveguide arrangement 1 that is low in loss for the electromagnetic waves 2 and extremely reliable.

This is because, on the one hand, there is at least substantially no play in the manufacture of the connection between a conventionally designed substrate-integrated waveguide and a coupling structure for coupling the substrate-integrated waveguide to a conventional waveguide. Reflections and losses due to tolerances in this environment are thus reduced in an advantageous manner. On the other hand, the substrate-integrated waveguide 22 can merge directly into the waveguide formed by the cavity 4 with the printed circuit board material 5, so that a decidedly compact design can be realized.

The substrate-integrated waveguide 22 particularly preferably has a boundary surface 24, preferably adjoining an electrically conductive material on all (four) sides and/or on the end face, with which the substrate 7 of the substrate-integrated waveguide 22 directly adjoins the cavity 4. The interface 24 is thus in particular not covered with an electrically conductive material 3.

The fact that the interface 24 is surrounded by conductive material 3 in the form of the conductive layer 8, the back 6 and the walls 20 or the conductive layer or plating 45 results in a window for the electromagnetic waves 2 between the substrate integrated waveguide 22 and the cavity 4. In this way, the cavity 4 of the waveguide arrangement 1 is completely and uninterruptedly surrounded by conductive material 3, with the exception of the window or interface 24 and any openings and coupling points of the waveguide formed by the cavity 4—for example for connection to external components such as antennas or the like.

The interface 24 preferably extends transversely or perpendicularly to the transmission direction for electromagnetic waves 2 indicated by the arrow 13 and/or perpendicularly to the plane spanned by the main extension direction(s) 19 of the printed circuit board material 5. The coupling from the substrate-integrated waveguide 22 into the cavity 4 made possible by this again enables a very compact design compared to solutions in which decoupling from the substrate-integrated waveguide 22 occurs essentially perpendicular to its main extension direction 19.

In an advantageous manner, an electromagnetic wave 2 guided by the substrate-integrated waveguide 22 is thus not deflected, or only insignificantly deflected, to couple into the cavity 4 or, conversely, to couple out of the cavity 4 into the substrate 7 of the substrate-integrated waveguide 22.

The interface 24 is preferably produced by the fact that after structuring of the printed circuit board material 5 and—if necessary after production of the conductive layer, coating with the plating 45 or deposition of conductive material 3 on the walls 20 or side walls 21 for connection of the back 6 to the conductive layer 8—the material 3 forming the wall 20, the conductive layer or the plating 45 is or is removed again in the region of the interface 24, in particular by a machining process, preferably milling, or by laser or the like. This has proved to be particularly efficient for producing the waveguide arrangement 1 according to the proposal.

The surface structure 9 of the back 9 is preferably structured starting from a, in particular commercially available, (HF) printed circuit board base material by structuring the side having the conductive layer 8 and/or the substrate 7. This is done particularly preferably by a machining process, in particular milling, by laser or the like. The cavity 4 is thus preferably created at least in part by removing sections of the conductive layer 8, the substrate 7 and parts of the back 6 from an (HF) printed circuit board base material.

In a preferred aspect of the present invention, the surface structure 9 of the back 6 is first fabricated in an (RF) printed circuit board base material by patterning the conductive layer 8, the substrate 7 and the back 6. Subsequently, the substrate 7 is exposed laterally of the patterned regions and accordingly electrically separates the conductive layer 8 from the back 6.

An electrically conductive connection can then be made between the conductive layer 8 and the back 6. This produces the previously described wall 20 or plating 45. This can be done by depositing conductive material 3, in particular by so-called "copper plating".

Preferably, but not necessarily, one or more electrically conductive layers are subsequently deposited on the surface. In particular, the conductive surface is tempered, passivated and/or gold-plated. Preferably, the aforementioned conductive layer or plating 45 is formed in this way. This offers the advantage of good long-term stability due to corrosion protection with simultaneously low surface resistances, which are advantageous for the formation of low-loss waveguide structures.

The interface 24 is then preferably formed by removing the wall 20, conductive layer or plating 45 in the region of an end face of the substrate 7 forming the substrate integrated waveguide 22. In this way, the previously explained interface 24 results, in which the substrate 7 forming the substrate-integrated waveguide 22 is directly adjacent to the cavity 4.

Formation of the window or interface 24 can also be accomplished by a machining process, particularly preferably by milling.

The opening of the window or formation of the interface 24 can in principle also take place at another stage of the manufacturing process, for example after formation of the walls 20 or plating 45 and before a gold-plating process, so that no conductive or metallic material 3 is present in the region of the interface 24 at the time of gold-plating and, in the case of a preferred electroplating, deposition of conductive material 3 or other passivation, no conductive material 3 is deposited, so that the interface 24 retains or obtains the function described.

FIG. 2A shows a simplified schematic view of the printed circuit board material 5 in the unprocessed state (also called printed circuit board base material or PCB base material).

The printed circuit board material 5 has at least the back 6 and the conductive layer 8. These can be adjacent to each other or, as in the illustrative example and preferably, separated from each other by the substrate 7.

The conductive layer 8 is preferably bonded to the back 6 and/or the substrate 7, which can be done with a material bond, preferably with adhesive, in particular an adhesive layer, or other bonding agent. If the substrate 7 and the back 6 are realized as separate layers, i.e. the substrate 7 does not form the back 6 or vice versa, the substrate 7 is preferably connected to the back 6 on one side and to the conductive layer 8 on another, preferably opposite, side, in particular on opposite flat sides. This can also be done with an adhesive, but alternatively or partially also by another material connection such as welding or the like. Thus, the conductive layer 8 can be glued to the substrate 7 and the substrate 7 can be glued or welded to the back 6.

In the sense of the present invention, the conductive layer 8, the back 6 and/or the substrate 7 are also (directly) adjacent to each other if an adhesive layer/bonding layer or the like is arranged between the conductive layer 8, the back 6 and/or the substrate 7 for the purpose of bonding. Such adhesives or adhesion promoters are not shown for reasons of clarity and, in case of doubt, are to be assigned to the substrate 7 or form part of the substrate 7, in particular due to their generally electrically insulating properties. In this respect, the substrate 7 can be multilayered and, in addition to a main layer which is central in cross-section, can have one or more adhesive layers/bonding layers facing the conductive layer 8 and/or the back 6.

Apart from this, the conductive layer 8, the back 6 and/or the substrate 7 preferably consist of a homogeneous material. The substrate 7 can carry a metal layer on the side facing away from the conductive layer 8, via which the substrate 7 is or will be connected to the back 6, in particular soldered. From another perspective, this is a multilayer back 6. This metal layer may in turn be bonded to the substrate 7, for example by means of an adhesive or bonding agent. Thus, in one example, the printed circuit board material 5 may have the conductive layer 8 bonded by means of an adhesive layer to the substrate 7, which in turn is bonded by means of an adhesive layer to a further metal layer, which in turn is bonded (by means of an adhesive layer), soldered (by means of a solder layer) or welded to the back or thereby forms part of the back 6.

The back 6 is preferably plate-shaped and preferably runs completely in a plane or is bounded by planar flat sides, which preferably extend along the main extension direction 19 of the back 6. The planar flat sides are preferably arranged parallel to each other, so that the back 6 is an at least substantially planar plate with an at least substantially constant material thickness. This preferably changes only in the areas in which the surface structure 9 or recess 10 is or will be formed at a later time, as described further below.

The conductive layer 8 preferably runs at least substantially parallel to the back 6 and/or without interruption in the unprocessed printed circuit board material 5. The conductive layer 8 is preferably also an at least substantially planar layer with flat sides running at least substantially parallel to its main extension plane, which further preferably run parallel to the flat side or sides of the back 6. The back 6 and the conductive layer 8 are thus preferably arranged parallel or in parallel planes to one another.

In principle, the back 6 can be or have the substrate (dielectric) 7. The back 6 can therefore be electrically insulating and directly or indirectly support the conductive layer 8.

Preferably and in the illustrative example, the substrate 7 is arranged between the back 6 and the conductive layer 8, which also runs in a plane in unprocessed areas, has flat sides, or boundary surfaces to the back 6 on the one hand and to the conductive layer 8 on the other hand and/or is an at least substantially constant layer of constant material thickness which is at least substantially uninterrupted before processing.

Accordingly, the printed circuit board material 5 is preferably a sandwich structure consisting of the back 6, the substrate 7 and the conductive layer 8.

Particularly preferably, the back 6, which preferably primarily gives the printed circuit board material 5 its mechanical stability, is formed from a conductive material. In particular, as already mentioned, it is a metal back, for example made of copper and/or brass.

The printed circuit board material 5 prior to its processing, i.e. the printed circuit board base material, has the back 6 and the conductive layer 8 and optionally the substrate 7 directly adjacent to and bonded to one another. This does not exclude the possibility that a composite of the conductive layer 8 and the substrate 7 is first applied to a back 6 before further processing, i.e. is bonded to the back 6 over the entire surface, so that the result is the structure shown schematically in FIG. 2A.

FIG. 2B shows how the surface structure 9 or recess 10 is created starting from the unprocessed printed circuit board material 5. In the example shown in FIG. 2, a laser is used to structure the surface of the back 6 by removing material so that the material thickness of the back 6or is reduced at the processed location. Preferably, this does not affect the surface of the back 6 on the side facing away from the conductive layer 8. The flat side of the back 6 facing away from the conductive layer 8 is and thus preferably remains at least essentially flat or continues to run in one plane, in particular without interruption The processing of the printed circuit board material 5 preferably also removes the material located above the structured area of the back 6. In the case of the layered structure with the back 6, the substrate 7 and the conductive layer 8 the conductive layer 8 the substrate 7 and parts of the back 6 preferably removed so that the recess 10 is formed which extends from the surface of the conductive layer 8 into the back 6. This also applies in the case where no substrate 7 is present.

The recess 10 or surface structure 9 preferably has a bottom extending at least substantially parallel to the main direction/plane 19 of extension of the printed circuit board material 5 and flanks or walls 20 extending transversely, in particular perpendicularly, to the main direction/plane 19 of extension of the printed circuit board material 5, or is produced accordingly.

The recess 10 is preferably formed in the form of a blind hole. Here, the back 6 forms the bottom and directly adjacent parts of the lateral boundary of the recess 10 or surface structure 9.

It is understood that the schematic illustration according to FIG. 2B is only exemplary for a small section of the surface structure 9 or recess 10 usually formed as a whole. In particular, it should be mentioned at this point that the ratios of the layer thickness of the back 6, the substrate 7 and the conductive layer 8arenotor need not be true to scale.

FIG. 2C shows a further processing step of the printed circuit board material 5 to form the cavity 4. The cavity 4 is preferably formed or delimited by providing the recess 10 with the electrically conductive walls 20, which preferably bridge the substrate 7 in an electrically conductive manner or form the electrically conductive boundary surfaces 12 or parts thereof.

Preferably, the printed circuit board material 5 is coated by depositing electrically conductive material. Particularly preferably, the printed circuit board material 5 is plated, as exemplified previously. In this way, the (respective) wall 20 can be formed. In the illustrative example, the coating is shown only in the region of the recess 10. However, it can extend over the conductive layer 8.

The (respective) wall 20 preferably covers the (side or front) surface of the substrate 7, which is initially open after processing, as exemplified in FIG. 2B, in a conductive manner over at least substantially the entire surface. In the case where the back 6 is electrically conductive, as is preferred, the wall 21 thus preferably connects the conductive layer 8 in a conductive manner to the conductive back 6 and in so doing covers the initially open substrate layer 7, thus sealing it in particular with electrically conductive material 3, preferably completely.

In the example shown, the electrically conductive material 3 forming the wall 20 also covers at least substantially the entire surface of the surface structure 9 or recess 10 in the area of the back 6 for manufacturing reasons.

In particular, the conductive material 3 forming the wall 20 lines the recess 10 at least substantially without interruption or over the entire surface. Optionally, but not shown in FIG. 2C, the conductive material can also extend over the conductive layer 8 as an additional layer i.e. it can be produced over the entire surface of the conductive layer 8 (on the side of the conductive layer 8 facing away from the back 6) in the course of production. In this case, the walls 20 shown in the illustrative example according to FIG. 2C are then preferably formed in any case. Optionally, the layer of conductive material 3 can be formed, in particular deposited, on the conductive layer 8 or in the bottom area of the recess 10 or the surface structure 9.

The conductive material 3 or the wall/walls 20 can be multilayered, preferably comprising a metal layer, in particular a copper layer, deposited in particular by plating, which in turn is or has been provided on the surface with a coating, in particular gold-plated. The plating can take place after or before the opening of the substrate window explained in connection with FIG. 2D.

In FIG. 2D, the substrate-integrated waveguide 22 is formed by the electrically insulating substrate 7 between the electrically conductive back 6 and the conductive layer 8. For this purpose, a section of the substrate 7 is conductively bounded on the one hand by the conductive layer 8 and the back 6 and on the other hand by slots or grooves 23, which are preferably also provided with conductive material 3 and form a conductive lateral boundary surface for the substrate 7, which preferably extends without interruption between the conductive layer 8 and the back 6. Accordingly, in the region of the grooves 23 the substrate 7 is surrounded on four sides with conductive material and an electro-magnetic wave is then capable of propagation in the surrounded substrate 7, so that the substrate-integrated waveguide 22 is formed.

It is understood that other conductive structures can be used as an alternative to the slots or grooves 23, which preferably electrically conductively connect the conductive layer 8 to the electrically conductive back 6 and form lateral electrically conductive boundary surfaces for the section of the substrate 7 bounded there e.g. by the use of via rows or the like instead of the grooves 23.

The slots or grooves 23 may be filled or at least partially filled with electrically conductive material 3, in particular the same or the same electrically conductive material 3 that is also preferably deposited to form the walls 20, in the course of forming the electrically conductive walls 20. The joint formation of the wall 20 or walls 20 and the electrically conductive lateral boundary surfaces for the substrate-integrated waveguide 22 is an advantageous aspect of the present invention.

Particularly preferably, the electrically conductive lateral boundaries for the formation of the substrate-integrated waveguide 22 are formed in a common process with the walls 20, in particular during the same deposition of conductive material 3. In particular, at least the section of the side of the printed circuit board material 5 in which the recess 10 and the substrate-integrated waveguide 22 (to be formed) or the structures bounding the latter, such as the grooves 23, are provided is plated together. Here, the surface of the conductive layer 8 may optionally be or become plated as well, which is not shown for reasons of simplification.

It is preferred that, for the purpose of coupling electromagnetic waves 2 in and/or out, the interface 24 of the substrate 7 is formed or opened, via which the substrate 7 is directly adjacent to the recess 10, the surface structures 9 and/or the cavity 4. The interface 24 here forms a window for the entry and/or exit of electromagnetic waves 2 from the substrate-integrated waveguide 22 into the cavity 4 and/or from the cavity 4 into the substrate-integrated waveguide 22. A structure for impedance matching can be provided in addition as already explained by way of example in connection with FIG. 2.

The cavity 4 preferably does not break through the back 6. The back 6 is and remains preferably closed without interruption.

The cavity 4 and/or the recess 10 forming or bounding the cavity 4 preferably extends slot-like or groove-like primarily along the main extension direction or in the main extension plane 19 of the printed circuit board material 5. In particular, the recess 10 is or forms a groove or an elongated slot which extends through the conductive layer 8 into the back 6, preferably through the substrate 7, and preferably extends longer in the direction of the main extension plane or main extension direction 19 of the printed circuit board material 5 than perpendicular thereto. In particular, the surface structure 9 or recess 10 is thus a groove which, covered with a cover 11, forms the cavity 4 in which modes can propagate in the direction of the longitudinal extension or main extension of the groove walls 20 and/or bottom of the groove-shaped recess 10 or groove preferably run at least essentially parallel or perpendicular to the main extension plane or main extension direction 19 of the printed circuit board material 5.

FIG. 3 shows the printed circuit board material 5 and at least one, in the illustrative example two or more, different covers 11, which correspond (respectively) to the printed circuit board material 5 in such a way that mounting them (respectively) to each other forms or can form the cavity 4 or the waveguide formed with the cavity 4.

The waveguide arrangement 1 can have a conductor track, in particular stripline 25, formed with the printed circuit board material 5 and produced in particular by structuring the conductive layer 8. The conductor track or stripline 25 can serve to establish an electrical connection, signal connection and/or the connection or mounting of electronic components or be used for this purpose.

The stripline 25 may have a transition 27 at a stripline end 26 for coupling with the substrate integrated waveguide 22. Alternatively or additionally, the stripline 25 may have or form a transition 27 at the stripline end 26 for coupling with the cavity 4 or waveguide formed therewith (not shown).

The one or more conductor tracks or strip lines 25 is/are preferably produced by means of structuring the conductive layer 8. In particular, it is a matter of one or more microstrip lines for which the back 6 acts as a reference electrode or ground plane, which is separated from the strip line(s) 25 formed in the conductive layer 8 or by patterning the conductive layer 8 by the substrate 7 (dielectric).

The conductive path(s) or stripline(s) 25 may be used to be connected, for example via one or more bonding wires, flip-chip connections or the like, to a semiconductor device, in particular to its outputs for transmitting and/or inputs for receiving signals. The signals may form the electromagnetic wave 2 by coupling into the substrate-integrated waveguide 22 or the cavity 4 or, conversely, the signals may be generated from the electromagnetic wave 2 from the cavity 4 or the substrate-integrated waveguide 22 in the stripline 25.

While strip lines 25, which can also be designed as differential strip lines, are realized at least essentially only with the printed circuit board material 5, the cavity 4 for forming the waveguide of the waveguide arrangement 1 is preferably formed by combining a part of the cavity 4 formed in the printed circuit board material 5 with a part of the cavity 4 formed in the cover 11. The corresponding surface structure 9 of the printed circuit board material 5 or back 6 and the surface structure 17 of the (respective) cover 11, which preferably corresponds and/or is complementary thereto, is shown in FIG. 3.

Advantageously, the cover 11 can also be formed with or from printed circuit board material 5, or, as in the illustrative example, from a structured, electrically conductive (solid) material.

The waveguide arrangement 1 may comprise an orthomode transducer 28. The orthomode transducer 28 is shown in particular in FIGS. 4 to 6.

An orthomode transducer 28 is a component preferably formed in waveguide technology, often abbreviated OMT and also called orthomode coupler, which splits circularly polarized waves or combines orthogonally polarized waves. In the present case, the orthomode transducer 28 preferably forms a waveguide functional element 14 formed with the printed circuit board material 5 or back 6.

The orthomode transducer 28 of the present embodiment is preferably formed at least in part by the cavity 4 bounded by the printed circuit board material 5 and/or the back 6 of the printed circuit board material 5 and/or the cavity 4 bounded thereby. For the rest, it may be formed or complemented by a corresponding or complementary surface structure 17 of the cover 11.

The waveguide arrangement 1 may have a plurality of waveguide functional elements 14, in particular connected in series. In particular, the waveguide functional elements 14 are formed in each case or throughout at least partially by the printed circuit board material 5, in particular the surface structure 9 of the back 6.

Particularly preferred here is the realization of a matching structure 15 followed by another waveguide functional element 14, in the illustration example the orthomode transducer 28.

In particular, a combination is preferred in which the same printed circuit board material 5 comprises or forms the substrate-integrated waveguide 22, a transition therefrom to the cavity 4 and, formed by the cavity 4 or the waveguide formed therewith, one or more waveguide functional elements 14 successively realized as waveguide functional elements 14 starting from the substrate-integrated waveguide 22.

In the illustrative example, the transition between the substrate-integrated waveguide 22 and the cavity 4 is followed first by the matching structure 15 and then, optionally or exemplarily for a waveguide functional element 14, by the orthomode transducer 28 or an input 29 of the orthomode transducer 28.

The orthomode transducer 28 is particularly preferably coupled to the substrate-integrated waveguide 22, which is preferably also formed at least in part by the back 6 of the printed circuit board material 5, via the matching structure 15 formed at least in part by the back 6 of the printed circuit board material 5. The matching structure 15 is thus preferably arranged between the substrate-integrated waveguide 22 and the orthomode transducer 28.

The waveguide arrangement 1 particularly preferably has at least two, preferably at least or exactly three, matching structures 15 formed with the back 6, each coupling an input 29 of the orthomode transducer 28 to a substrate integrated waveguide 22.

FIG. 3 shows two differently formed covers 11, each corresponding to the same surface structure 9 of the PCB material 5 of the back 6 of the PCB material 5. In the context, it is preferred that the properties of the waveguide formed by the cavity 4 depend on and can be varied by combining the same back 6 having the same surface structure 9 with different covers 11 to form different cavities 4 or waveguides formed thereby.

In a particularly advantageous process, a waveguide arrangement 1 preferably as previously described is manufactured, wherein the printed circuit board material 5 having the back 6, which has the surface structure 9, is combined with one of several, available, different covers 11 to form a cavity 4 of a waveguide.

In other words, the waveguide arrangement 1 is combined from the back 6 of the circuit board material 5 and one of a plurality of different covers 11, each of which is directly or indirectly connectable to the back 6 to form a waveguide.

Here, the covers 11 are each designed to form waveguides of different waveguide properties or with different waveguide functional elements 14 by connection to the back 6 comprising the cavity 4.

Accordingly, by selecting, using, or replacing a cover 11 and bonding it to the circuit board material 5 or back 6, a waveguide with the waveguide characteristics selectable by selection of the cover 11 is created. In particular, the matching or can be configured waveguide functional element characteristics by selecting one of the plurality of different covers 11. In particular, it is possible to form different waveguide functional elements 14 or to influence their properties by selecting one of the plurality of covers 11.

More generally speaking, thus, an aspect of the present invention relates to a system based on a surface structure 9 of a printed circuit board material 5 configured to form a waveguide and a plurality of alternative covers 11 configured to form different cavities 4 or waveguide functional elements 14 with the surface structure 9.

In the embodiment example according to FIG. 3, one of the different covers 11, in particular the lower cover 11 in FIG. 3, is provided with a surface structure 17 by which only an outwardly open cavity 4 or waveguide with only one opening 32 is formed when this cover 11 is connected to the printed circuit board material 5. In this case, it is preferred that in the embodiment example the orthomode transducer 28, which is formed with corresponding surface structures 9, 17 of the back 6 and the cover 11 corresponding to each other, is designed to separately forward electromagnetic waves 2 introduced into the cavity 4 from the outside into, in particular, horizontal and vertical components. The forwarding is preferably carried out via matching structures 15 and/or substrate-integrated waveguides 22, as explained in principle previously.

If an alternative cover 11 is selected, in particular the upper cover 11 in FIG. 3, a waveguide arrangement 1 with a different function can be realized. In this case, three openings 32 and at least one cavity 4 can be formed. Further surface structures 17 can optionally be limited only by the conductive layer 8, whereby in any case one cavity 4 is formed with the printed circuit board material 5. Further cavities can be formed by surface structures 17 which are bounded on the part of the printed circuit board material 5 only by the conductive layer 8. As a result, several cavities 4 or waveguides can be formed, in particular each with an opening 32. In the illustrative example, it is provided that the surface structure 9 of the printed circuit board material 5 or back 6, which previously formed part of the orthomode transducer 28, now no longer fulfills or realizes the function of an orthomode transducer 28. Instead, the surface structure 9 of the printed circuit board material 5 or back 6 is supplemented by the cover 11 or its surface structure 17 in such a way that another function is fulfilled, for example an adaptation or merely transmission or filtering of electromagnetic waves 2.

Alternatively or additionally, the further apertures 32 of cavities 4 may be used accordingly to couple separate electromagnetic waves 2 into separate cavities 4.

As a result, in the embodiment example, by selecting or replacing the cover 11 with the same printed circuit board material 5 having the same surface structure 9, completely different functions can be achieved, for example, the formation of a circularly polarized electromagnetic wave 2 by combining orthogonally mutually linearly polarized electromagnetic waves 2 in one case or a multi-channel transmitting and/or receiving function in the other case.

The waveguide arrangement 1 preferably has, in particular depending on the choice of the cover 11, several cavities 4, waveguide functional elements 14, substrate-integrated waveguides 22 and/or strip lines 25 separated from each other. This allows in an advantageous way to realize different waveguide functions depending on the choice of a corresponding cover 11, but to combine them alternatively or additionally, preferably also depending on the choice of the cover 11, to (more complex) functions.

This idea is not limited to the specific embodiment example, since other waveguide functional elements 14 as well as another combination of the same or similar waveguide functional elements 14 can be advantageously created using the printed circuit board material 5 or back 6 and, in particular, the surface structure 9 formed therewith.

To form the waveguide arrangement 1, the printed circuit board material 5 and in particular the back 6 preferably have one or more assembly and/or adjustment means 30. In the illustration example, these are recesses or openings, in particular holes, threaded holes, grooves, springs, pins and/or the like.

The cover(s) 11 preferably have(s) mounting and/or adjustment means 31 corresponding or complementary thereto. Corresponding techniques for joining a split-block lower part, which in the present case can be formed by the printed circuit board material 5, with a split-block upper part, which in the present case is preferably formed by the cover 11 or one of the covers 11, in a precisely fitting manner to one another in order to form the cavity 4 or, with this, the waveguide, are basically known in the prior art and can be applied in the present case in a corresponding manner.

A special feature in this context is the preferred use of the printed circuit board material 5 and in particular of the back 6 to form an assembly and/or adjustment means 30 or that the printed circuit board material 5 or the back 6 has this. Advantageously, the fact that the printed circuit board material 5 or the back 6 has the assembly and/or adjustment means 30 makes it possible to achieve a particularly compact design.

FIG. 4 shows a sectional perspective view of the waveguide arrangement 1 looking at the outer surface 1A or into the cavity 4, in particular through the opening 32. Components of the optional orthomode transducer 28 arranged in the cavity 4, parts of the matching structure 15, and the interface 24 enabling the transition for coupling the electromagnetic waves 2 from the cavity 4 into the substrate 7 of the substrate-integrated waveguide 22 can be seen.

In the example shown, the opening 32 is initially adjoined by a waveguide section 33, which only fulfills the function of guiding the electromagnetic wave 2.

The orthomode transducer 28 has a back element 34 which, preferably together with the other structures collectively forming the cavity 4, causes the orthomode transducer 28 to function. In particular, the back element 34 is shown in FIG. 5.

The back element 34 preferably has a web-like design and/or projects into the cavity 4 in a web-like manner. Preferably, the back element 34 has one or more steps.

In the illustration example, the orthomode transducer 28 with its back element 34 is realized separately from the matching structure 15, which is directly adjacent to the structure of the orthomode transducer 28 with its back element 34, but does not overlap here. Thus, an adaptation has already been carried out at least substantially at the boundary between the matching structure 15 and the back element 34 of the orthomode transducer 28. Accordingly, the orthomode transducer 28 can be omitted if necessary.

The opening 32 of the waveguide arrangement 1 for coupling the electromagnetic waves 2 in and/or out can be used directly, for example for coupling the electromagnetic waves 2 in and/or out of a waveguide element 35 and/or in and/or out of an antenna 36. The waveguide element 35 and/or the antenna 36 can be attached to the waveguide arrangement 1 by means of one or more attachment means 37. For example, screwing on is possible.

In the illustration example according to FIG. 4, the waveguide element 35 or the antenna 36 are merely reduced in size and schematically indicated. In principle, numerous different add-on parts compatible with waveguides can be combined with the proposed waveguide arrangement 1 as required. The attachment parts shown only schematically in the form of the waveguide element 35 or the antenna 36 are therefore only examples.

The antenna 36 can in particular be a dielectric antenna designed as described in WO 2009/100891 A1. By means of such a dielectric antenna, a compact antenna with high aperture efficiency can be realized in particular in a simple manner.

The antenna described in WO 2009/100891 A1 is hereinafter referred to as dielectric antenna 38. In particular, the dielectric antenna 38 is shown in FIGS. 7 and 8.

The dielectric antenna 38 has a coupling element 39 for coupling electromagnetic waves 2 into and/or out of the dielectric antenna 38, and a lens 40 made of a dielectric material.

The dielectric antenna 38 is preferably designed to transmit and receive electromagnetic waves 2, in particular simultaneously.

The antenna 38 or lens 40 preferably has a transmitting area 41 for transmitting and/or receiving electromagnetic waves 2. The transmitting area 41 is preferably arranged on a side of the lens 40 facing away from the coupling element 39.

In particular, the operation of the dielectric antenna 38 is based on the fact that electromagnetic waves 2 are coupled into the lens 40 via the coupling element 39, which then propagate in the lens 40 and are radiated with the transmitting area 41. Conversely, when receiving, electromagnetic waves strike the transmitting area 41, which in this case functions as the receiving area, are forwarded through the lens 40 to the coupling element 39 or are bundled onto the coupling element 39 and there are decoupled out of the lens 40 or antenna 38.

The lens 40 is—at least in the transmission area 41—at least essentially ellipsoidal in shape.

The antenna 38 or lens 40 preferably has a main axis 42. Preferably, the antenna 38 or lens 40 is symmetrical, in particular rotationally symmetrical, with respect to the principal axis 42. The main axis 42 preferably forms a main or symmetry axis of the ellipsoid defined by the transmission area 41.

Preferably, the transmission area 41 to the coupling element 39 is arranged such that the electromagnetic waves 2 emitted by the lens 40 have an at least substantially plane phase front 44 in the main radiation direction 43 of the antenna 38.

The phase front 44 is shown schematically in FIG. 7. In FIG. 7, it is further indicated how the electromagnetic waves 2 propagate within the lens 40 starting from the schematically shown coupling element 39 and are refracted at the ellipsoidal shaped rim of the lens 40 in the transmission area 41 in accordance with the laws of wave optics and are radiated from the lens 40 essentially in the main radiation direction 43.

In other embodiments of the dielectric antenna 38 not shown in detail herein, the transmission area of the lenses each defines a plurality of ellipses whose principal axes are substantially coaxially aligned. In particular, the ellipses have a focal point substantially in common because this allows the desired characteristics of the radiated electromagnetic radiation to be achieved.

The coupling element 39 is preferably arranged at least substantially in a focal point of the ellipsoid defined by the at least ellipsoidal shaped transmitting region 41 of the lens 40, because the focal point property of the ellipsoidal shaped transmitting region 41 of the lens 40 can be exploited particularly advantageously in connection with the geometrical-optical refraction properties of electromagnetic waves 2 at the edge of the lens 40 or at the dielectric jump edge of the dielectric material of the lens 40 to the surroundings of the lens 40.

In particular, the coupling element 39 is configured to couple electromagnetic waves 2 from the waveguide or cavity 4 of the waveguide arrangement 1 into the dielectric antenna 38 or lens 40 and/or from the dielectric antenna 38 or lens 40 into the waveguide or cavity 4. Preferably, the cavity 4 is arranged at least substantially coaxial with the main axis 42.

Various embodiments of the coupling element 39, which can also be used in the present invention, are described in WO 2009/100891 A1, in particular with reference to FIGS. 4 to 7.

In an advantageous manner, the previously described measures allow the waveguide arrangement 1 to be constructed as a flat or planar, compact module. In particular, the waveguide arrangement 1 is thinner than 3 cm, preferably thinner than 2 cm, in particular thinner than 1.5 cm. This makes it possible to form the waveguide arrangement 1 into a distinctly compact system by plugging it onto or into another structure such as an antenna 36.

In such cases, mounting of add-on parts on the waveguide arrangement 1 for coupling electromagnetic waves 2 into and/or out of the cavity 4 can also be carried out particularly advantageously at least essentially perpendicular to the main extension plane of the entire waveguide arrangement 1, which preferably corresponds to the main extension direction 19 of the printed circuit board material 5.

For example, the waveguide arrangement 1 can be advantageously inserted into a, for example, slot-like receptacle of an add-on part such as an antenna 36, and the add-on part can then be fastened, adjusted and/or mounted by fastening means (not shown) extending transversely or perpendicularly to the printed circuit board material 5 or to the waveguide arrangement 1.

The add-on parts in the form of the waveguide element 35 and/or the antenna 36, as shown by way of example in FIG. 4, could also be modified accordingly in such a way that a mounting area is provided which embraces the waveguide arrangement 1 on different sides opposite one another with respect to the main extension direction or main extension plane 19 for the purpose of attachment.

FIG. 5 shows the back 6 of the printed circuit board material 5 without substrate 7 and conductive layer 8. It can be seen that the matching structure 15 is formed at least partially in the back 6, in particular by recesses. The same preferably applies to further or all waveguide functional elements 14 of the waveguide arrangement 1, each of which is formed at least partially by the printed circuit board material 5 or the back 6.

Another example of the part of a waveguide functional element 14 formed with or in the back 6, in particular by recess, is the orthomode transducer 28. Also in this respect, it can be seen that in the specific embodiment example the orthomode transducer 28 is realized separately from the matching structure 15 and these are formed in series in the cavity 4. However, other solutions are also possible here.

FIG. 6 shows an exploded view of the PCB material 5 according to the proposal for forming the waveguide arrangement 1. With regard to the surface structure 9 of the back 6, reference is made to the explanations on FIG. 5.

In addition, the substrate 7 is preferably formed in alignment with the remaining surface structure 9 of the back 6 or the part thereof that laterally bounds the cavity 4 or is covered by an at least substantially planar wall 20 as a conductive layer or plating 35 in such a way that the section of the wall 20, conductive layer or plating 45 shown offset in FIG. 6 completely covers the substrate 7 in a conductive manner. As a result, the cavity 4 can be completely surrounded by the conductive material 3 and accordingly form a waveguide for conducting the electromagnetic waves 2 in the cavity 4.

In the region of the waveguide functional elements 14, the conductive layer 8 is preferably perforated in alignment with the walls 20 and forms an at least substantially planar surface for connection or application and, in particular, preferably planar application of the cover 11 to form the waveguide arrangement 1. In this case, the conductive layer 8 is preferably formed in alignment with one another, in particular structured, in the same way as the substrate 7 and lateral boundary surfaces of the back 6.

Waveguide functional elements 14 such as the matching structure 15 may/may be formed in the printed circuit board material 5 and in the back 6, respectively, at least substantially in mirror image with respect to the main extension direction 19 and main extension plane, respectively. In particular, it is preferred that the plane in which the substrate 7 is arranged and in particular a plane bisecting the substrate 7 forms a mirror plane for the surface structure 9 of the back 6 and the surface structure 17 of the cover 11, at least in sections or in part.

In one aspect of the present invention, a fully integrated or integrable antenna coupling or antenna coupling structure with OMT functionality is proposed in the combination of the PCB circuit board material 5 and the cover 11. Advantageously, this consists or function determining components are preferably with only two parts, namely the PCB printed circuit board material 5 structured according to the proposal and the one-piece cover 11—instead of the function being or being composed of many individual parts, as was previously common.

Different aspects of the present invention may be combined separately or in different combinations.

Other aspects of the present invention, which may be implemented separately or combined with the aspects explained, relate to:

1. Waveguide arrangement 1 for guiding electromagnetic waves 2 in a cavity 4 surrounded by conductive material 3, wherein the waveguide arrangement 1 has a printed circuit board material 5 which has a preferably plate-shaped back 6 and a conductive layer 8,
characterized
in that the back 6 has a surface structure 9, preferably formed by at least one recess 10, by which the wave-carrying cavity 4 is at least partially directly delimited; and/or
in that the cavity 4 is formed in split-block technology by bonding the printed circuit board material 5 as the split-block lower part to a corresponding cover 11 as the split-block upper part.

2. Waveguide arrangement according to aspect 1, characterized in that the back 6 consists at least predominantly of an electrically conductive material 3 and the printed circuit board material 5 has an electrically insulating substrate 7 at least in sections between the back 6 and the conductive layer 8, or in that the back 6 forms an electrically insulating substrate 7.

3. Waveguide arrangement according to aspect 1 or 2, characterized in that the waveguide arrangement 1 comprises a waveguide functional element 14, wherein the waveguide functional element 14 is at least partially formed by the back 6 of the circuit board material 5.

4. Waveguide arrangement according to aspect 3, characterized in that the waveguide functional element 14 is a matching structure 15, preferably wherein the matching structure 15 comprises steps 6 formed at least in part by or in the back 6.

5. Waveguide arrangement according to any of the preceding aspects, characterized in that the cover 11 has a surface structure 17 corresponding to the back 6 of the printed circuit board material 5 such that the combination of printed circuit board material 5 and cover 11 surrounds the cavity 4, thereby forming the waveguide, preferably rectangular waveguide 18, preferably wherein the surface structure 17 of the cover 11 and the surface structure 9 of the back 6 each have steps 16 which in combination form a matching structure 15.

6. Waveguide arrangement according to any of the preceding aspects, characterized in that the conductive layer 8 and the substrate 7 are at least substantially removed in the part of the printed circuit board material 5 and/or the back 6 is exposed on the substrate side in the part in which the back 6 directly bounds the cavity 4.

7. Waveguide arrangement according to any of the preceding aspects, characterized in that the conductive layer 8 is electrically connected to the back 6 of the printed circuit board material 5 at least substantially perpendicular to the main extension direction of the printed circuit board material 5 by electrically conductive walls 20, said walls 20 laterally delimiting the cavity 4 so that a rectangular waveguide 18 is formed, preferably wherein the walls 20 are aligned with side walls 21 of the cover 11, whereby these together laterally delimit the cavity 4 and in this way form the rectangular waveguide 18.

8. Waveguide arrangement according to any of the preceding aspects, characterized in that the waveguide arrangement 1 comprises a substrate-integrated waveguide 22 in the circuit board material 5, preferably wherein the substrate-integrated waveguide 22 is coupled to the cavity 4.

9. Waveguide arrangement according to aspect 8, characterized in that a boundary surface 12 of the substrate integrated waveguide 22 and the cavity 4 is integrally formed by the back 6 of the printed circuit board material 5.

10. Waveguide arrangement according to aspect 8 or 9, characterized in that the substrate-integrated waveguide 22 directly adjoins the cavity 4 of the waveguide with a boundary surface 24 which preferably adjoins electrically conductive material 3 on all sides and/or on the end face.

11. Waveguide arrangement according to any of the preceding aspects, characterized in that the waveguide arrangement 1 comprises a stripline 25 formed with the printed circuit board material 5, which stripline 25 comprises or forms a transition 27 at a stripline end 26 for coupling with the substrate integrated waveguide 22 and/or waveguide.

12. Waveguide arrangement according to any of the preceding aspects, characterized in that the waveguide arrangement lcomprisesas waveguide functional element 14 an orthomode transducer 28 formed at least partially by the back 6 of the printed circuit board material 5.

13. Waveguide arrangement according to aspect 12, characterized in that the orthomode transducer 28 is coupled to a substrate integrated waveguide 22 formed at least in part through the back 6 of the printed circuit board material 5 via a matching structure 15 formed at least in part through the back 6 of the printed circuit board material 5; preferably wherein the waveguide arrangement 1 comprises at least two, preferably at least or exactly three, matching structures 15 formed with the back 6, each coupling an input 27 of the orthomode transducer28 to a substrate integrated waveguide 22.

14. System comprising a waveguide arrangement 1 according to one of the preceding aspects and an add-on part for coupling electromagnetic waves 2 into and/or out of the cavity 4 of the waveguide arrangement 1, wherein the add-on part can be connected to the waveguide arrangement 1 or can be connected to the cavity 4, wherein the add-on part is or comprises an antenna 36, 38, preferably wherein the antenna 36, 38 comprises a lens 40 consisting of a dielectric material for the electromagnetic waves 2, wherein the lens 40 is at least substantially ellipsoidal in shape.

15. Method of producing a waveguide arrangement 1 from a back 6 of a printed circuit board material 5 and one of a plurality of different covers 11 which can each be directly or indirectly connected to the back 6 to form the waveguide, the covers 11 each being designed to form waveguides of different waveguide properties by connection to the back 6, and a waveguide having the waveguide properties corresponding to the cover 11 being produced by selecting one of the covers 11 and connecting it to the back 6.

List of reference signs:

| | |
|---|---|
| 1 | waveguide arrangement |
| 2 | electromagnetic wave |
| 3 | conductive material |
| 4 | cavity |
| 5 | printed circuit board material |
| 6 | back |
| 7 | substrate |
| 8 | conductive layer |
| 9 | surface structure (back) |
| 10 | recess |
| 11 | cover |
| 12 | boundary surfaces |
| 13 | arrow (transmission direction) |

-continued

List of reference signs:

| | |
|---|---|
| 14 | waveguide function element |
| 15 | matching structure |
| 16 | steps |
| 17 | surface structure (cover) |
| 18 | rectangular waveguide |
| 19 | main extension direction or plane |
| 20 | wall (printed circuit board material) |
| 21 | side wall (cover) |
| 22 | substrate integrated waveguide |
| 23 | groove |
| 24 | boundary surface |
| 25 | strip line |
| 26 | strip line end |
| 27 | transition |
| 28 | orthomode transducer |
| 29 | input |
| 30 | assembly and/or adjustment means |
| 31 | assembly and/or adjustment means |
| 32 | opening |
| 33 | waveguide section |
| 34 | back element |
| 35 | waveguide element |
| 36 | antenna |
| 37 | fasteners |
| 38 | dielectric antenna |
| 39 | coupling element |
| 40 | lens |
| 41 | transmitting section |
| 42 | main axis |
| 43 | main radiation direction |
| 44 | phase front |
| 45 | plating |

The invention claimed is:

1. A method for manufacturing a waveguide arrangement comprising a cavity surrounded by conductive material for guiding electromagnetic waves, wherein at least part of the cavity is produced by removing from a printed circuit board material for manufacturing printed circuits, having at least one plate-shaped back and a conductive layer, in sections the conductive layer and parts of the back, whereby a surface structure in the form of a recess is formed, and wherein an electrically conductive wall is subsequently formed by depositing conductive material, which wall delimits the cavity.

2. The method according to claim 1, wherein the printed circuit board material has an electrically insulating substrate between the back and the conductive layer, wherein in addition to the conductive layer and the parts of the back, the substrate is also removed in sections, whereby the surface structure is formed in the form of a recess, wherein the substrate is exposed laterally of the structured areas and wherein subsequently by the deposition of the conductive material the electrically conductive wall covers the substrate.

3. The method according to claim 2, wherein the back consists at least predominantly of an electrically conductive material and the conductive layer is electrically connected to the back of the printed circuit board material by means of the wall.

4. The method according to claim 2, wherein the printed circuit board material comprises a substrate-integrated waveguide formed by the substrate of the circuit board material and coupled to the cavity.

5. The method according to claim 4, wherein an interface of the substrate-integrated waveguide, with which the substrate of the substrate-integrated waveguide directly adjoins the cavity is produced by removing the wall again in the region of the interface.

6. The method according to claim 5, wherein by surrounding the interface by conductive material in the form of the conductive layer, the back and the walls, a window for the electromagnetic waves results between the substrate-integrated waveguide and the cavity.

7. The method according to claim 5, wherein the interface extends transversely or perpendicularly to a transmission direction for electromagnetic waves and/or perpendicularly to the plane spanned by the main extension direction(s) of the printed circuit board material.

8. The method according to claim 1, wherein the waveguide arrangement comprises a waveguide functional element, wherein the waveguide functional element is at least partially formed by or in the back of the printed circuit board material.

9. The method according to claim 1. wherein the cavity is formed in split-block technology by bonding the printed circuit board material as the split-block lower part to a corresponding cover as the split-block upper part.

10. The method according to claim 1, wherein of a plurality of covers which can each be connected to the printed circuit board material to form the cavity and which are designed to form cavities of different waveguide properties by the connection to the printed circuit board material, one cover is selected and connected to the printed circuit board material, whereby the cavity is produced with the waveguide properties corresponding to the selected cover.

11. A waveguide arrangement for guiding electromagnetic waves in a cavity surrounded by conductive material, the waveguide arrangement comprising a PCB printed circuit board material for manufacturing printed circuits, the printed circuit board material having at least a plate-shaped back and a conductive layer, wherein the back has a surface structure by which the waveguiding cavity is at least partially delimited, and wherein the waveguide arrangement has a substrate-integrated waveguide in the printed circuit board material which is coupled to the cavity.

12. The waveguide arrangement according to claim 11, wherein the cavity is formed in split-block technology by joining the printed circuit board material as a split-block lower part with a corresponding cover as a split-block upper part.

13. The waveguide arrangement according to claim 11, wherein the back consists at least predominantly of an electrically conductive material and the printed circuit board material has an electrically insulating substrate at least in sections between the back and the conductive layer, or in that the back forms an electrically insulating substrate.

14. The waveguide arrangement according to claim 13, wherein a boundary surface of the substrate-integrated waveguide and the cavity is formed integrally and/or without interruption by the back of the printed circuit board material.

15. The waveguide arrangement according to claim 11, wherein the waveguide arrangement comprises a waveguide functional element, the waveguide functional element being at least partially formed by the back of the printed circuit board material.

16. The method according to claim 1, wherein the surface structure in the form of a recess does not break through the back transversely to its main direction of extension.

17. The method according to claim 3, wherein the conductive layer is electrically connected to the back of the printed circuit board material at least substantially perpendicular to a main extension plane of the printed circuit board material.

18. The method according to claim 9, wherein the cover has a surface structure which is formed in a corresponding or complementary manner to the surface structure of the back.

19. The waveguide arrangement according to claim 12, wherein the cover has a surface structure which is formed in a corresponding or complementary manner to the surface structure of the back.

* * * * *